United States Patent
Wu et al.

(10) Patent No.: US 8,736,482 B2
(45) Date of Patent: May 27, 2014

(54) SYSTEM AND METHOD FOR AIRCRAFT NAVIGATION USING SIGNALS TRANSMITTED IN THE DME TRANSPONDER FREQUENCY RANGE

(75) Inventors: Ryan Haoyun Wu, Manlius, NY (US); Marc J. Viggiano, Manlius, NY (US)

(73) Assignee: Saab Sensis Corporation, Wilmington, DE (US)

( * ) Notice: Subject to any disclaimer, the term of this patent is extended or adjusted under 35 U.S.C. 154(b) by 306 days.

(21) Appl. No.: 13/384,442

(22) PCT Filed: Jul. 19, 2010

(86) PCT No.: PCT/US2010/042379
§ 371 (c)(1),
(2), (4) Date: Mar. 13, 2012

(87) PCT Pub. No.: WO2011/009109
PCT Pub. Date: Jan. 20, 2011

(65) Prior Publication Data
US 2012/0162014 A1    Jun. 28, 2012

Related U.S. Application Data

(60) Provisional application No. 61/226,480, filed on Jul. 17, 2009, provisional application No. 61/226,476, filed on Jul. 17, 2009, provisional application No. 61/239,191, filed on Sep. 2, 2009, provisional application No. 61/306,652, filed on Feb. 22, 2010.

(51) Int. Cl.
*G01S 13/46* (2006.01)
*G01S 13/78* (2006.01)
*G01S 13/87* (2006.01)
*G01S 13/76* (2006.01)

(52) U.S. Cl.
CPC ............ *G01S 13/785* (2013.01); *G01S 13/878* (2013.01); *G01S 13/765* (2013.01)
USPC .............................................. 342/47; 342/30

(58) Field of Classification Search
CPC ....... G01S 13/785; G01S 13/878; G01S 5/06; G01S 13/765; G01S 13/781; G01S 13/876; G01S 13/91; G01S 13/913; G01S 13/93; G01S 1/024
USPC .......................................... 342/47, 30, 33, 36
See application file for complete search history.

(56) References Cited

U.S. PATENT DOCUMENTS

| | | | |
|---|---|---|---|
| 5,302,957 A | | 4/1994 | Franzen |
| 6,094,169 A | * | 7/2000 | Smith et al. .................. 342/465 |
| 8,063,744 B2 | * | 11/2011 | Wu et al. ...................... 340/10.1 |
| 8,497,798 B2 | * | 7/2013 | Schloetzer ...................... 342/32 |
| 2002/0133294 A1 | | 9/2002 | Farmakis et al. |

(Continued)

*Primary Examiner* — John B Sotomayor
(74) *Attorney, Agent, or Firm* — Burr & Brown, PLLC

(57) ABSTRACT

The present invention provides a system and method for aircraft to determine own position and navigate using a navigation heartbeat signal broadcast on a DME uplink and/or a Mode-S uplink frequency. The present invention enables deep integration between the existing navigation systems (DME interrogation-reply ranges and GPS/WAAS raw TDOA or pseudo range measurements) and the DME heartbeat TDOAs or Mode-S heartbeat TDOAs to provide a highly accurate navigation positioning capability and provide necessary backup capability in lieu of GPS to maintain the necessary RNP/RNAV capability and avoid degrading aircraft operational safety.

53 Claims, 14 Drawing Sheets

(56) References Cited

U.S. PATENT DOCUMENTS

| | | |
|---|---|---|
| 2005/0187677 A1 | 8/2005 | Walker |
| 2007/0040734 A1 | 2/2007 | Evers et al. |
| 2007/0247368 A1 | 10/2007 | Wu |
| 2007/0252760 A1* | 11/2007 | Smith et al. .................. 342/451 |
| 2010/0001895 A1* | 1/2010 | Leeson .......................... 342/36 |
| 2010/0079329 A1* | 4/2010 | Stayton ........................ 342/37 |
| 2011/0156878 A1* | 6/2011 | Wu et al. ..................... 340/10.1 |
| 2012/0162014 A1* | 6/2012 | Wu et al. ..................... 342/387 |

* cited by examiner

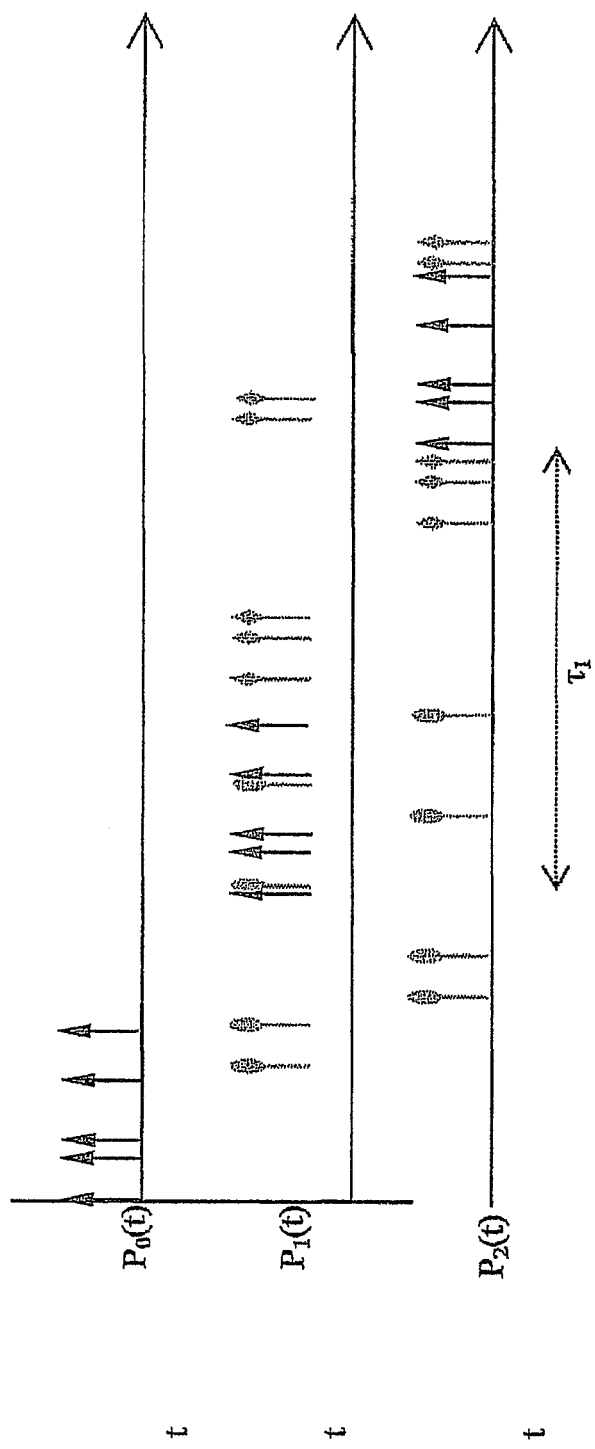

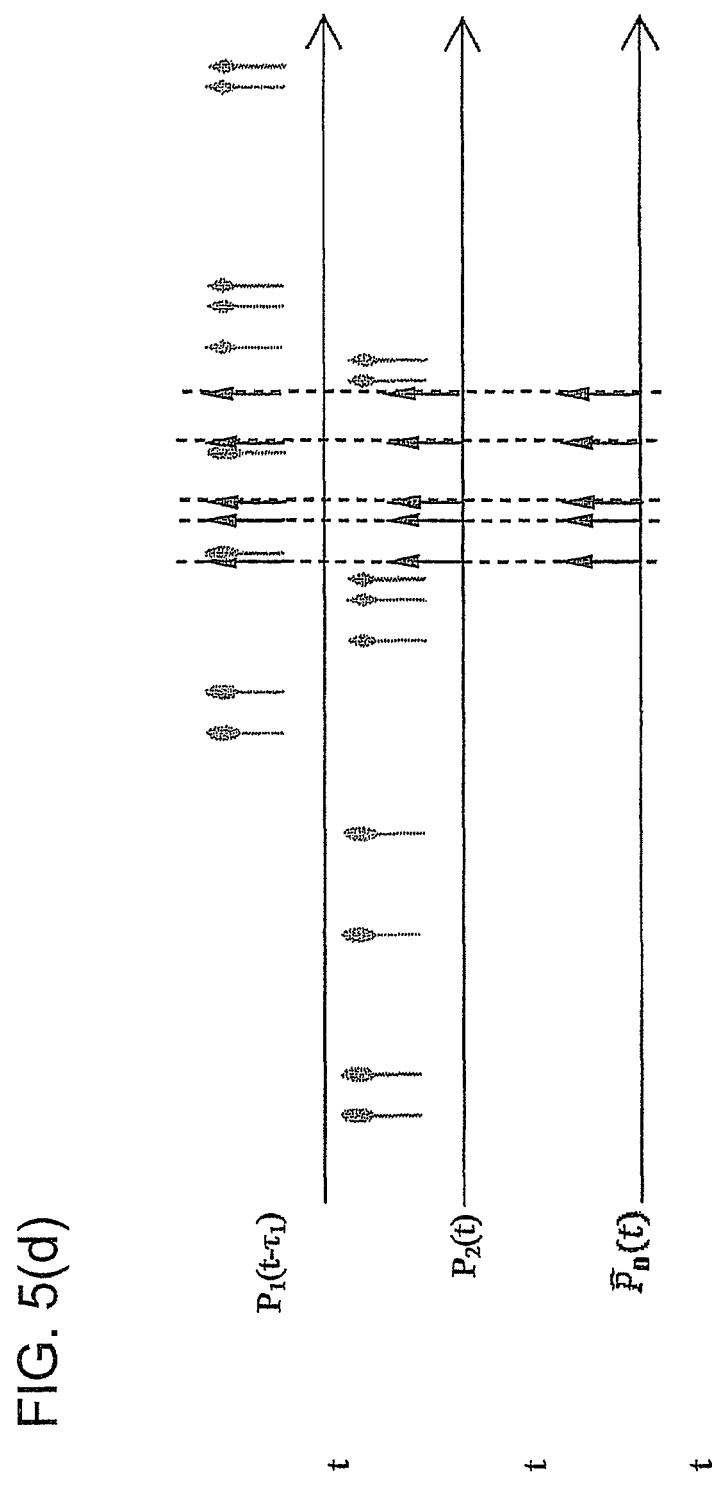

SYSTEM AND METHOD FOR AIRCRAFT NAVIGATION USING SIGNALS TRANSMITTED IN THE DME TRANSPONDER FREQUENCY RANGE

FIELD OF THE INVENTION

The invention relates to a system and method for providing aircraft navigation using the existing Distance Measuring Equipment (DME) ground transponder infrastructure and the Surveillance Broadcast Service (SBS) ADS-B ground station (GS) network. In one embodiment, the present invention synchronously broadcasts ground heartbeat signals to provide a means for aircraft navigation either in place of or as a backup system for fully-functioning GPS using SBS GS and DME ground transponders. In another embodiment, the present invention retransmits a DME reply signal from a DME Sensor Unit to provide at least one TDOA to an aircraft to determine its own position using the at least one TDOA and determined range from the DME transponder. In yet another embodiment, the present invention retransmits a DME reply signal from a Slave DME device to provide at least one TDOA to an aircraft to determine its own position using the at least one TDOA and determined range from the DME transponder.

BACKGROUND OF THE INVENTION

DME is a ground-based navigation system which consists of a network of ground transponders and airborne interrogating units (interrogators). In operation, an interrogator transmits DME pulse pair signals to be received by an intended ground transponder on a predetermined downlink frequency within the DME frequency band of 962 MHz to 1150 MHz. Upon receiving an interrogation pulse pair signal, the ground transponder determines whether the received signal is a valid interrogation signal by checking the spacing between the two pulses in the DME pulse pair signal. If a valid interrogation is detected, the ground transponder transmits a reply signal on a predetermined uplink frequency after a preset delay of approximately 50 μs. The reply signal consists of a pulse pair with a fixed spacing that is transmitted on a different predetermined uplink frequency within the DME frequency band. The specific pairing of interrogation and replying frequencies and the spacing between the pulses in the interrogation and replying pulse pair signals defines the DME channel/mode of the DME operation.

There are 126 frequency pairings (Channel #001~#126) and four spacing pairings (Mode X W Y Z) allocated for DME operation within the DME frequency band. Each channel consists of an interrogation frequency band and a replying frequency band that are separated from adjacent bands by 1 MHz. The purpose of defining DME channels and modes is to minimize the co-channel interference between adjacent DME transponders. It is important that adjacent DME transponders operate either on a different frequency or use different modes when operating on the same uplink or down link frequency.

Since the DME frequency range includes the uplink and downlink SSR frequency bands, the DME channels that are within these SSR frequency bands need to be reserved from usage for sites whose operating coverage area (including both interrogation and replying) overlaps with the coverage area of an operating SSR. The FAA Next Generation (NextGen) Automatic Dependent Surveillance-Broadcast (ADS-B) surveillance system, which is built upon SSR links, includes DME channels that overlap the SSR frequencies and these overlapping DME channels cannot be assigned to any DME operations.

The interrogation and replying operation between an interrogator (e.g., aircraft) and a ground transponder enables the aircraft to determine a range to the transponder based on the observed round-trip delay between the transmission of the interrogation pulse pair signal and receipt of the replying pulse pair signal. FIG. 1 illustrates the operating principles of legacy DME equipment. The distance from an aircraft (AC) to a DME transponder ground station (DME transponder) is determined by the onboard avionics (DME interrogator) that interrogates the DME transponder ground station. An interrogation signal containing quasi-randomly spaced DME pulse pairs are transmitted by the DME interrogator on a DME downlink frequency to the DME transponder, as shown in FIG. 1. Upon receiving the interrogation signal, the DME transponder determines whether the pulse pair of the interrogation signal is valid and, when the received interrogation signal is valid, the DME transponder replies with a reply signal containing an identical DME pulse pair to the interrogator on a DME uplink frequency after a fixed transponder delay. The DME interrogator receives the reply signal and correlates the received pulse pair in the reply signal with the known pulse pair transmitted in the interrogation signal to determine the total delay time. By subtracting the known transponder delay time ($t_d$) from the total delay time, dividing the resulting time delay by two, and then multiplying the result by the speed of light, the DME interrogator determines the range from the DME interrogator to the DME transponder.

A DME interrogator distinguishes DME transponder replies to its own interrogations from replies to other interrogations using the quasi-random spacing of successive pairs. The DME interrogator performs a correlation between the transmitted DME pulse pair interrogation spacing and the received pulse pair spacing from the transponder to determine if the correct quasi-random spacing can be identified in the received reply signal. An example of the quasi-randomly spaced sequence of pulse pairs for a DME interrogation signal and the DME reply signal are shown in FIG. 1. The randomness of the interrogation pulse pair sequence varies from DME transponder to DME transponder. For simplicity, DME transponders often use a random pick of a set of preselected spacing between two pairs of pulses to "stagger" the interrogation pulse pairs rather than arranging the pulse pair positions using truly random positions.

While the main purpose of the DME transponder is to reply to the interrogation signals from aircraft, the DME transponder also broadcasts its identity periodically. In accordance with international standards, approximately every 40 seconds, each transponder broadcasts its station ID using International Morse code in a time period not exceeding 10 seconds. To transmit the station ID, the DME transponder transmits a Morse code dot as a 0.1 to 0.16 second period consisting of pulse pair signals with a fixed rate of 1350 pp/s and a Morse code dash has a period that is three times longer than the Morse code dot.

When there are either no interrogations or very few interrogations, a DME transponder maintains a minimum pulse pair transmission rate of 700 pp/s by randomly transmitting pulse pairs that are not replies to an interrogation. When there are too many interrogations the transponder omits some of the replies and maintains a maximum transmission rate of between 2610 and 2790 pp/s.

After receiving a DME interrogation signal containing quasi-randomly spaced DME pulse pairs that the DME transponder determines is valid, the DME transponder will not respond to any new DME interrogation signals for up to 60 μs. During this "transponder dead time", the DME transponder will not reply to a second DME interrogation signal if the second DME interrogation signal arrives within 60 µs of the arrival time of the first DME interrogation signal that the DME transponder determines is valid. The purpose of this "transponder dead time" is to suppress unwanted DME interrogations caused by echo or multipath signals. The result of this "transponder dead time" is that no two DME reply signals will be transmitted closer than 60 µs on the DME reply signal.

The main purpose of DME operation is to allow aircraft to identify and obtain a range to a DME transponder. The DME interrogation pulses do not carry any information other than the unique randomness that is only meaningful to the DME interrogator.

FIG. 2 illustrates the operation principle of the prior art of DME-DME Area Navigation (RNAV) in which the position of an AC can be determined by onboard avionics that interrogate nearby DME transponders to obtain the ranges to the DME transponders and, based on the known locations of the DME transponders. The position of the AC can be calculated based on range multilateration techniques by solving the intersection of range spheres at the altitude indicated by the altimeter. This is referred to as DME-DME MLAT in this disclosure.

FIG. 3 illustrates the case where insufficient DME transponder coverage is obtained due to low altitude. In this case only one DME transponder is in sight such that the AC cannot determine its own position using DME-DME MLAT.

FIG. 4 illustrates the case where inadequate DME-DME MLAT position accuracy is obtained due to undesirable AC-DME transponders geometry. The uncertainty becomes greater if the intersection angles of the circles deviates from 90 degrees.

The next generation (NextGen) national airspace system (NAS) relies primarily on GNSS-based surveillance and navigation systems (i.e., GPS) to provide aircraft position information to the ground for surveillance and control purposes and to the air for navigation purpose.

A signal receiver that receives multiple signals from synchronous sources can determine its own location through means of multilateration (MLAT) using signals transmitted on the Secondary Surveillance Radar (SSR) frequencies of 1030±5 MHz and 1090±5 MHz bands. Generally two types of approaches are involved in the MLAT process. The first type of MLAT approach, generally known as the TOA MLAT or rho-rho navigation technique, assumes the transmission times from all transmitters are known to the receiver: hence the range to the transmitter can be calculated from the signal propagation time based on the time of arrival (TOA) of the signal. Given multiple ranges to different ground transmitters the position of the receiver can be solved as the intersection of the range-derived spheres. The second type of MLAT approach, generally known as the time difference of arrival (TDOA) MLAT technique, assumes the exact times of transmission of the signals are unknown to the receiver, but the transmissions are simultaneous or the relative transmission times are known. In most cases, the signals are transmitted simultaneously, but in other cases known delays are purposely introduced to stagger the time of transmission to avoid synchronous garbling of the signals at the receiver. In either case, the receiver uses the signals, TOAs and any known transmission delays to calculate the range difference of the received signals from pairs of transmitters. The position of the receiver is then calculated as the intersection of the range-difference derived hyperboloids.

The FAA NextGen Automatic Dependent Surveillance—Broadcast (ADS-B) surveillance system is built upon SSR links. However, the density of transmitted signals on the 1030 MHz and 1090 MHz SSR frequency bands is causing a significant amount of signal garbling and loss of data, especially in high traffic areas. Therefore, any system transmitting signals would need to transmit at frequencies other than the SSR frequency bands.

In addition, existing GNSS-based aircraft navigation systems can be disrupted by solar storms that cause severe ionosphere delay variations that degrade both GPS and WAAS and affect the L1 and L5 signals. Current correction broadcasting cannot keep up with the rapid variations during times of solar storms. Under these conditions, WAAS-only aircraft, which include many General Aviation (GA) aircraft, will lose their RNAV capability. Still further, in regional areas interference and jamming will cause weak GPS/WASS signals to be undetectable, thereby causing a loss of RNAV capability.

While the DME/DME or rho-rho MLAT technique, with or without inertial measurement unit (IMU), has been deemed an acceptable means for GPS backup for navigation, this approach suffers from the need of intense interrogations and the lack of DME/DME coverage in the current NAS. In addition, the DME/DME or rho-rho MEAT approach will almost certainly receive resistance from general aviation (GA) users due to the relative high cost of installing an on-board DME/DME or DME/IMU capable unit. Another potential option, eLoran, has not yet gained full political support for deployment and use worldwide.

In addition, there are practical concerns regarding intentional and unintentional interference, regional and temporal unavailability of GPS services, GPS avionic malfunctions and the need for a robust and economic backup solution to the GLASS-based surveillance and navigation systems.

What is needed is a system and method that provides an aircraft position determination and navigation capability in the NAS (National Airspace System) as a backup to or to augment the existing GNSS-based aircraft navigation system.

SUMMARY OF THE INVENTION

According to a first aspect of the present invention, there is provided a DME aided multilateration method for a DME interrogator to determine its own position, the method comprising transmitting interrogation pulses from a DME interrogator that are received by a DME transponder and at least one DME Sensor Unit (DSU), and transmitting reply pulses from the DME transponder in response to the interrogation pulses that are received from the DME interrogator. The at least one DSU for receiving and determining a TOA for the interrogation pulses transmitted by the DME interrogator and the reply pulses transmitted by the DME transponder, associating the received interrogation pulses and reply pulses, determining a time delay between associated interrogation pulses and reply pulses, determining a time difference of arrival (TDOA) from the determined time delay and the known distance between the DSU and the DME transponder, and transmitting at least the TDOA and the DSU ID to the DME interrogator. The DME interrogator for receiving at least the TDOA and the DSU ID from the at least one DSU, associating the received TDOA from the at least one DSU to a specific transmission of interrogation pulses from the DME interrogator, and determining the DME interrogator position using the received TDOA and range data determined from the transmitted interrogation pulses and the received reply pulses in response to the transmitted interrogation pulses from the DME transponder.

In some embodiments of the present invention, the method further comprises receiving a Mode S signal from a Mode S transponder at two or more Mode S multilateration ground receiving units (RUs), wherein at least one RU is co-located with the DME transponder, determining at least one TDOA for the Mode S transponder signal, associating the at least one TDOA determined for the Mode S transponder signal with one or more received TDOAs clustered to a specific transmission of interrogation pulses from the at least one DME interrogator using time, and determining the position of the at least one DME interrogator using the one or more received TDOAs clustered to a specific transmission of interrogation pulses from the at least one DME interrogator, the at least one TDOA determined for the Mode S transponder signal and range data from the at least one DME transponder determined from the transmitted interrogation pulses and the received reply pulses in response to the transmitted interrogation pulses.

In other embodiments, the method further comprises the DME interrogator using altitude data from an altimeter to determine the DME interrogator position. In some embodiments, the received interrogation pulses are a DME DL transmission. In other embodiments, the received reply pulses are a DME UL transmission.

According to a second aspect of the present invention, there is provided a DME Aided Multilateration method for a DME interrogator to determine its own position, the method comprising transmitting interrogation pulses from at least one DME interrogator that are received by at least one DME transponders and at least one slave DME device and transmitting reply pulses from at least one DME transponder in response to the interrogation pulses that are received from the at least one DME interrogator. At least one slave DME device receiving the reply pulses transmitted by the at least one DME transponder and retransmitting at least first pulses of the received reply pulses after a predetermined delay. The at least one DME interrogator receiving the reply pulses transmitted by the at least one DME transponder, receiving the at least first pulses of the reply pulses transmitted by the at least one slave DME device, associating the received reply pulses transmitted by the at least one DME transponder and the at least first pulses of the reply pulses transmitted by the at least one slave DME device; determining a time delay between the received reply pulses transmitted by the at least one DME transponder and the at least first pulses of the reply pulses transmitted by the at least one slave DME device; determining a time difference of arrival (TDOA) from the determined time delay and the known transmission delay of the at least one slave DME device, and determining the position of the at least one DME interrogator using the determined TDOA and range data from the at least one DME transponder determined from the transmitted interrogation pulses and the received reply pulses in response to the transmitted interrogation pulses.

In some embodiments of the present invention, the method further comprises receiving a Mode S signal from a Mode S transponder at two or more Mode S multilateration ground receiving units (RUs), wherein at least one RU is co-located with the DME transponder, determining at least one TDOA for the Mode S transponder signal, associating the at least one TDOA determined for the Mode S transponder signal with one or more received TDOAs clustered to a specific transmission of interrogation pulses from the at least one DME interrogator using time, and determining the position of the at least one DME interrogator using the one or more received TDOAs clustered to a specific transmission of interrogation pulses from the at least one DME interrogator, the at least one TDOA determined for the Mode S transponder signal and range data from the at least one DME transponder determined from the transmitted interrogation pulses and the received reply pulses in response to the transmitted interrogation pulses. In other embodiments, the method further comprises the DME interrogator using altitude data from an altimeter to determine the DME interrogator position.

According to a third aspect of the present invention, there is provided a slave DME-DME navigation system, comprising a DME interrogator, a DME transponder, and at least one slave DME device, wherein the DME interrogator transmits interrogation pulses that are received by the DME transponder and the DME transponder transmits reply pulses in response to the received interrogation pulses, and the at least one slave DME device receives the reply pulses transmitted by the DME transponder and retransmits at least first pulses of the received reply pulses after a predetermined delay. The DME interrogator receives the reply pulses transmitted by the DME transponder and the at least first pulses of the received reply pulses retransmitted by the at least one slave DME device after the predetermined delay, associates the received reply pulses transmitted by the DME transponder and the at least first pulses of the received reply pulses retransmitted by the at least one slave DME device, determines at least one time difference between the received reply pulses transmitted by the DME transponders and the at least first pulses of the received reply pulses retransmitted by the at least one slave DME device, determines at least one TDOA from the determined at least one time difference and the predetermined delay of the at least one slave DME device, and determines a position of the DME interrogator using the at least one TDOA and range data from the DME transponder determined from the transmitted interrogation pulses and the received reply pulses in response to the transmitted interrogation pulses.

In some embodiments of the present invention, the system further comprises an altimeter providing altitude data, wherein the system uses the altitude data, the determined TDOA measurement and range data from the DME transponder to determine the position of the DME interrogator. In some embodiments, the DME interrogator is an aircraft.

In some embodiments, the at least one slave DME device retransmits the at least first pulses of the received reply pulses on a different frequency after a predetermined delay. In other embodiments, the at least one slave DME device retransmits the at least first pulses of the received reply pulses on the same frequency after a predetermined delay.

In some embodiments, the at least first pulses of the received reply pulses are retransmitted in a DME dead-time window of the DME transponder with a short ID of the at least one slave DME device modulated onto the reply pulses. In other embodiments, the DME dead-time window is divided into multiple slots and each slave DME device is assigned a time slot within the DME dead-time window.

In some embodiments, each slave DME device of the at least one slave DME device retransmits the at least first pulses of the received reply pulses using pulse width encoding. In other embodiments, each slave DME device of the at least one slave DME device retransmits the at least first pulses of the received reply pulses using phase shift keying.

In some embodiments, the DME-DME navigation system comprises two or more slave DME devices and another DME interrogator receives the reply pulses transmitted by the DME transponder and the reply pulses retransmitted by the two or more slave DME device and determines a position for the another DME interrogator using at least two TDOAs determined from the received reply pulses transmitted by the DME transponder and the reply pulses retransmitted by the two or more slave DME devices.

According to a fourth aspect of the present invention, there is provided a DME aided multilateration system, the system comprising a plurality of DME transponders, at least one DME sensor unit (DSU), and at least one DME interrogator, wherein the at least one DME interrogator transmits interrogation pulses that are received by at least one DME transponder and at least one DME transponder transmits reply pulses in response to the interrogation pulses that are received from the at least one DME interrogator. The at least one DSU receives the interrogation pulses transmitted by the at least one DME interrogator and the reply pulses transmitted by the at least one DME transponder, determines a time of arrival (TOA) for the interrogation pulses and the reply pulses, associates the received interrogation pulses and reply pulses, determines a time delay between associated interrogation pulses and reply pulses, determines a time difference of arrival (TDOA) from the determined time delay and the known distance between the DSU and the at least one DME transponder and transmits at least the TDOA and the DSU ID to the at least one DME interrogator. The DME interrogator receives at least the TDOA and the DSU ID from the at least one DSU, associates the received TDOA from the at least one DSU with one or more received TDOAs clustered to a specific transmission of interrogation pulses from the at least one DME interrogator using tune, and determines the DME interrogator position using the received TDOA and range data determined from the transmitted interrogation pulses and the received reply pulses.

In some embodiments of the present invention, the system further comprises at least two Mode S multilateration ground receiving units (RUs) and at least one of the at least two Mode S RUs is co-located with the DME interrogator, wherein the at least two Mode S RUs receive a Mode S signal from a Mode S transponder and determine at least one TDOA from the Mode S signal; associate the at least one TDOA for the Mode S signal with the TDOA determined by the at least one DSU using time and determine the position of the at least one DME interrogator using the determined by the at least one DSU, the determined TDOA for the Mode S transponder signal and range data from the at least one DME transponder determined from the transmitted interrogation pulses and the received reply pulses in response to the transmitted interrogation pulses.

According to a fifth aspect of the present invention, there is provided a method for a target to multilaterate own position, the method comprising receiving a heartbeat signal transmitted by a plurality of ground transmitters of known location, time stamping a time of arrival (TOA) for the received heartbeat signals at the target, pairing the received heartbeat signals and determining a time difference of arrival (TDOA) between the received heartbeat signals using the TOAs, and determining the position of the target from the determined TDOAs.

In some embodiment, the heartbeat signal is transmitted by a plurality of DME transponders, the heartbeat signal comprises a sequence of pulse pairs with a predetermined pseudo-random pulse-pair-to-pulse-pair spacing pattern known to the DME interrogators, and the DME interrogators determines the time of arrival (TOA) of DME heartbeat signals by correlating the received DME transponder signals with the known heart beat pulse-pair-to-pulse-pair spacing patterns.

In some embodiments, the heartbeat signals are transmitted simultaneously by at least some DME transponders of the plurality of DME transponders on DME transponder reply transmission frequency bands. In other embodiments, the target determines TDOAs from the TOAs for each pair of DME transponder of the plurality of DME transponders and determines own position from the TDOAs determined for each pair of DME transponders of the plurality of DME transponders.

In some embodiments, at least some of the heartbeat signals are transmitted non-simultaneously with known time offsets for each DME transponder of the plurality of DME transponders on DME transponder reply transmission frequency bands. In some of these embodiments, the time offsets are encoded in the heartbeat signals. In other embodiments, the target determines TDOAs by subtracting the known time offsets from the TOAs for each pair of DME transponders of the plurality of DME transponders and determines own position using the TDOAs determined for each pair of DME transponder of the plurality of DME transponders.

In some embodiments, the heartbeat signal is transmitted by a plurality of Mode S ground receiver units (RUs). In some of these embodiments, the heartbeat signals are transmitted simultaneously by at least some of the RUs of the plurality of RUs. In some embodiments, the heartbeat signals that are transmitted simultaneously further comprising selecting a group of ground transmitters of known location of the plurality of ground transmitters of known location to cover a particular area, selecting one of the group of ground transmitters of known location as a master transmitter and the remaining ground transmitters of the group of ground transmitters as slave transmitters, transmitting a pre-heartbeat signal from the master transmitter in a predetermined time window prior to transmission of the heartbeat signal, and transmitting the heartbeat signal from at least the group of ground transmitters of known location a predetermined time period after the pre-heartbeat signal.

In some embodiments, the heartbeat signals transmitted by each RU further comprises a data payload comprising a known direct-sequence spread spectrum (DSSS) coding that is unique to each RU and is orthogonal to DSSS coding in heartbeat signals of other RUs, correlating each received heartbeat signal with the known DSSS coding of each RU to determine TOA for each received heartbeat signal at the target, determining TDOAs from the TOAs for each pair of RUs of the plurality of RUs at the target, and determining own position from the TDOAs from the plurality of RUs at the target.

In other embodiments, the heartbeat signals are transmitted non-simultaneously by at least some RUs of the plurality of RUs with known time offsets for each RU. In some embodiments of these embodiments, the time offsets are encoded in the heartbeat signals. In some embodiments, the target determines TDOAs by subtracting the known time offsets from the TOAs for each pair of RUs of the plurality of RUs and determines own position using the TDOAs determined for each pair of RUs of the plurality of RUs. In other embodiments, the target determines own position by a combination of TDOAs from a plurality of DME transponders and TDOAs from a plurality of RUs.

In some embodiments, the Mode-S RU heartbeat signals are transmitted by a plurality of DME transponders. In other embodiments, the Mode-S RU heartbeat signals are transmitted by RUs co-located with DME transponders.

According to a sixth aspect of the present invention, there is provided a system for a target to determine its own position, the system comprising a plurality of ground transmitters of known location and at least one target, the plurality of ground transmitters of known location transmitting a heartbeat signal, and the at least one target receives the heartbeat signal from at least four ground transmitters of the plurality of ground transmitters, determines a time of arrival (TOA) for the received heartbeat signals, determines a time difference of arrival (TDOA) between the received heartbeat signals using the determined TOAs, and determines the position of the target from the determined TDOAs.

In some embodiments, the heartbeat signal is transmitted by a plurality of DME transponders, the heartbeat signal comprises a sequence of pulse pairs with a predetermined pseudo-random pulse-pair-to-pulse-pair spacing pattern known to DME interrogators, and the DME interrogators determine the time of arrival (TOA) of DME heartbeat signals by correlating the received DME transponder signals with the known heartbeat pulse-pair-to-pulse-pair spacing patterns. In some of these embodiments, the plurality of ground transmitters are DME transponders and at least some of the DME transponders transmit the heartbeat signal simultaneously on DME transponder reply transmission frequency bands. In some embodiments, the target determines TDOAs from the TOAs for each pair of DME transponder of the plurality of DME transponders and determines own position from the TDOAs determined for each pair of DME transponders of the plurality of DME transponders.

In other embodiments, at least some of the plurality of DME transponders transmit the heartbeat signal non-simultaneously with known time offsets for each DME transponder on DME transponder reply transmission frequency bands. In some of these embodiments, the time offsets are encoded in the heartbeat signals. In some embodiments, the target determines TDOAs by subtracting the known time offsets from the TOAs for each pair of DME transponder of the plurality of DME transponders and determines own position using the TDOAs determined for each pair of DME transponders of the plurality of DME transponders.

In some embodiments, the plurality of ground transmitters are a plurality of Mode S ground receiver units (RUs). In some of these embodiments, at least some of the plurality of RUs transmit the heartbeat signal simultaneously. In some embodiments, the system further comprises a group of ground transmitters of known location of the plurality of ground transmitters of known location are selected to cover a particular area, one of the group of ground transmitters of know location is designated as a master transmitter and the remaining ground transmitters of the group of ground transmitters are designated as slave transmitters, the master transmitter transmits a pre-heartbeat signal in a predetermined time window prior to transmission of the heartbeat signal, and at least the group of ground transmitters of known location transmit the heartbeat signal at a predetermined time period after the pre-heartbeat signal.

In some embodiments, the heartbeat signals transmitted by each RU further comprises a data payload comprising a known direct-sequence spread spectrum (DSSS) coding that is unique to each RU and is orthogonal to DSSS coding in heartbeat signals of other RUs, wherein a target correlates each received heartbeat signal with the known DSSS coding of each RU to determine TOA for each received heartbeat signal at the target, the target determines TDOAs from the TOAs for each pair of RUs of the plurality of RUs at the target, and the target determines own position from the TDOAs from the plurality of RUs at the target. In other embodiments, at least some of the plurality of RUs transmit the heartbeat signal non-simultaneously with known time offsets for each RU of the plurality of RUs. In some of these embodiments, the time offsets are encoded in the heartbeat signals.

In some embodiments, the target determines TDOAs by subtracting the known time offsets from the TOAs for each pair of RUs of the plurality of RUs and determines own position from the TDOAs from the plurality of RUs. In other embodiments, the target determines own position by a combination of TDOAs from a plurality of DME transponders and TDOAs from a plurality of RUs.

According to a seventh aspect of the present invention, there is provided a system for a target to determine its own position, the system comprising a plurality of ground transmitters of known location and at least one target, wherein the plurality of ground transmitters of known location transmitting a heartbeat signal, and the at least one target receiving the heartbeat signal from at least three ground transmitters of the plurality of ground transmitters, determines a time of arrival (TOA) for the received heartbeat signals, determines a time difference of arrival (TDOA) between the received heartbeat signals using the determined TOAs, determines an altitude of the target from an altimeter, and determines the position of the target from the determined TDOAs and determined altitude.

BRIEF DESCRIPTION OF THE DRAWINGS

For a fuller understanding of the nature and objects of the invention, reference should be made to the following detailed description of a preferred mode of practicing the invention, read in connection with the accompanying drawings in which:

FIG. 5(b) illustrates the interrogation signal including pulse pairs transmitted by the DME interrogator, the reply signal containing the pulse pairs transmitted by the DME transponder, and the pulse pairs transmitted by the DSU over time;

FIG. 5(d) illustrates an example of the reconstruction of the transmitted pulse pairs transmitted in the interrogation signals and corresponding reply signals performed by the DSU of the present invention;

DETAILED DESCRIPTION OF THE INVENTION

Figure 1:
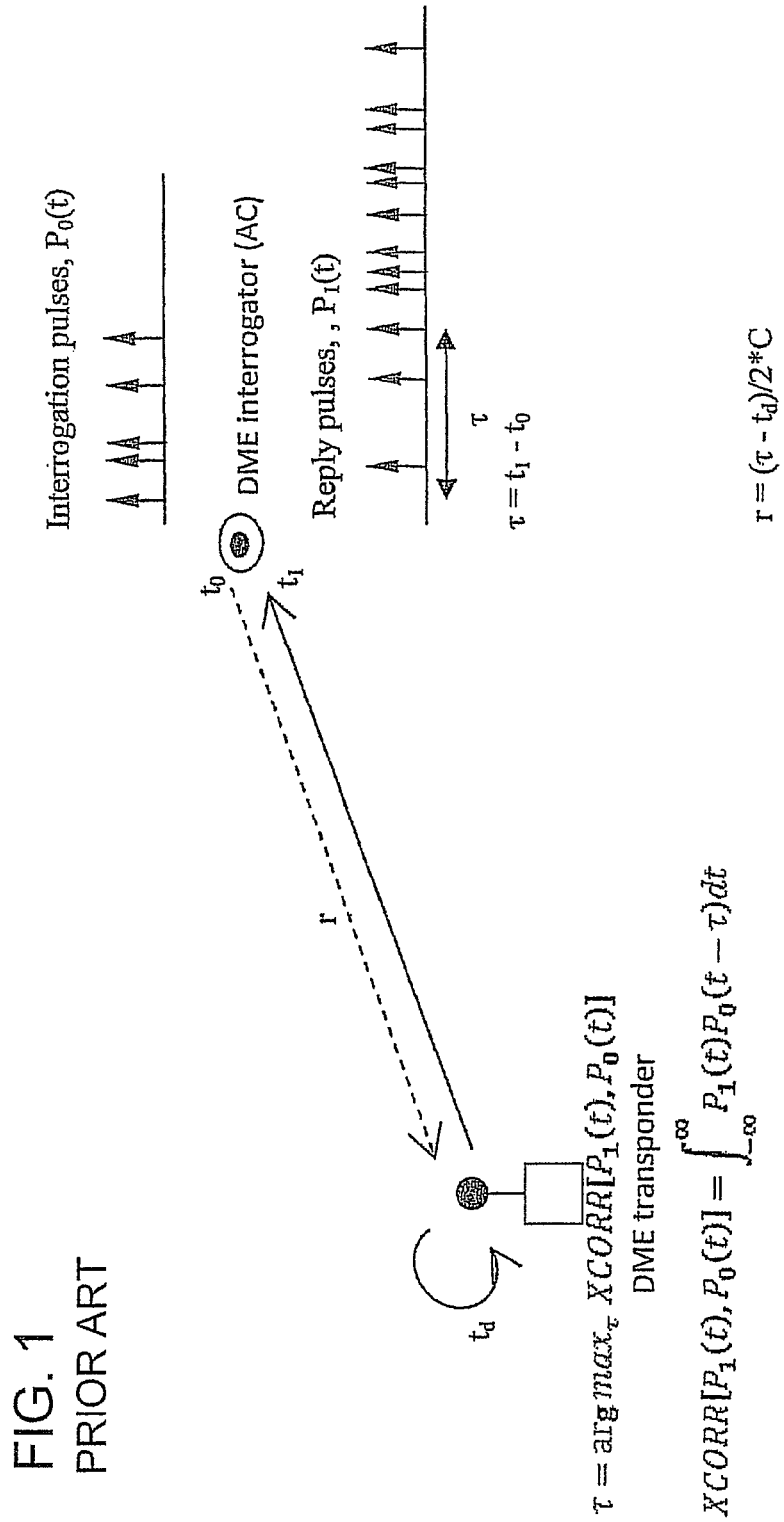
FIG. 1 illustrates the operating principles of legacy DME equipment.
Figure 2:
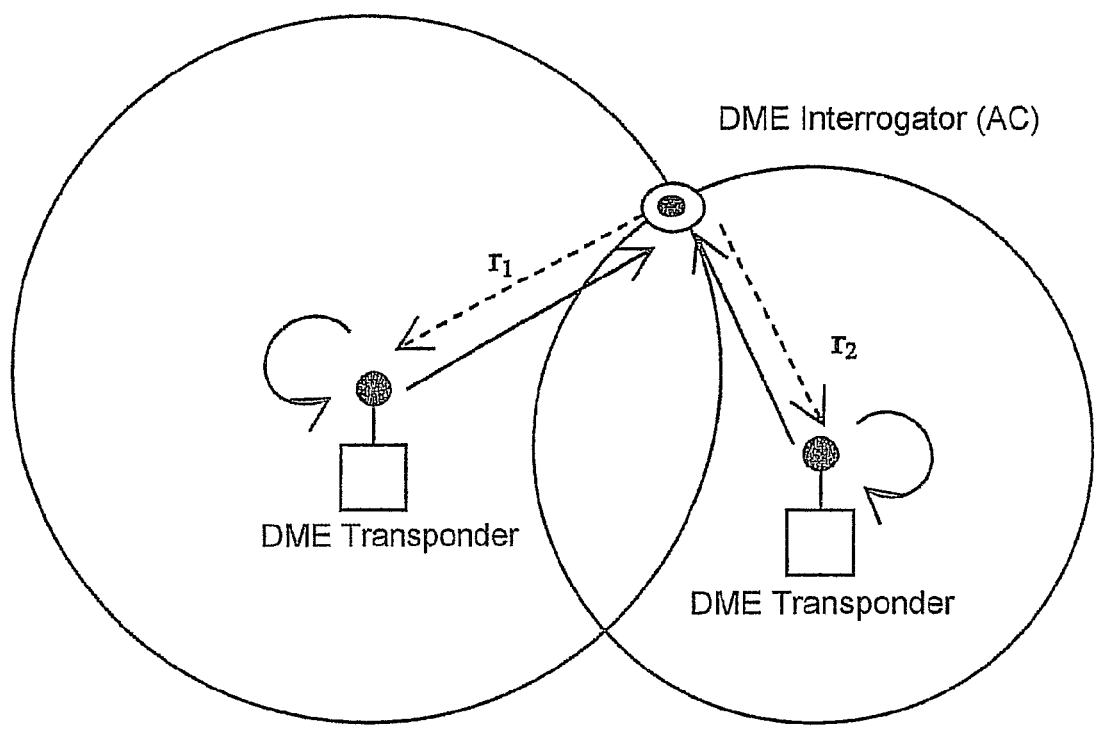
FIG. 2 illustrates the operation principle of the prior art of DME-DME Area Navigation (RNAV)
Figure 3:
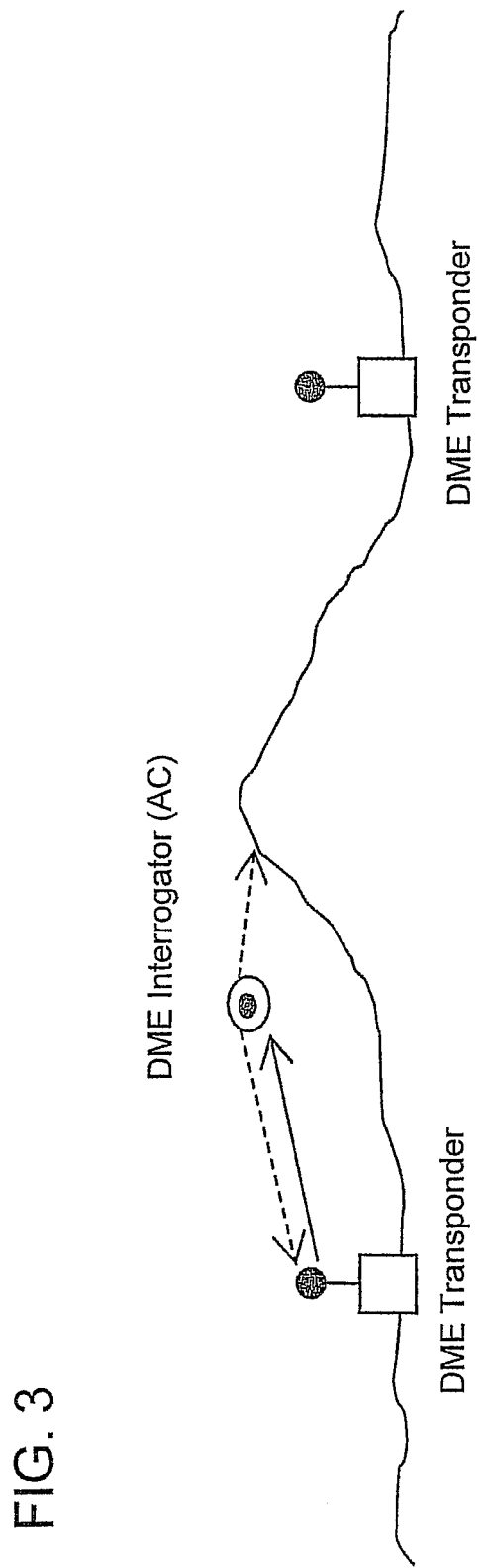
FIG. 3 illustrates insufficient DME transponder coverage due to low altitude.
Figure 4:
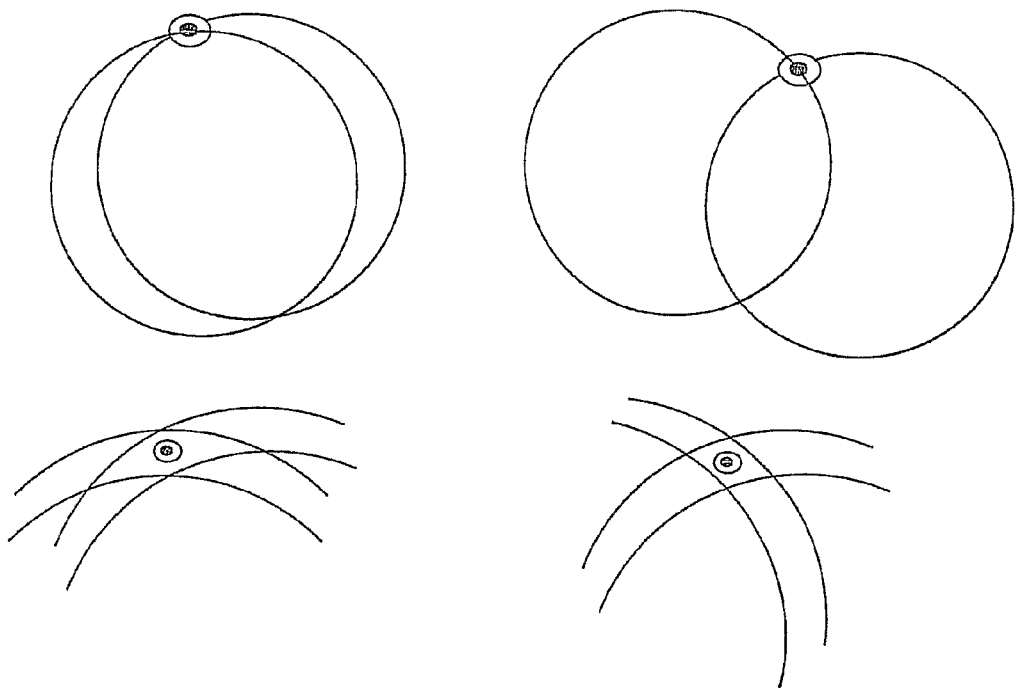
FIG. 4 illustrates undesirable AC-DME transponders geometry that causes poor DME-DME MLAT position accuracy.

The present invention provides a navigation infrastructure in lieu of fully-functioning GPS and traditional NAV AID, such as VOR and NDB, by utilizing the existing DME ground station network and SBS GS network. The present invention enables a greater synergy between the DME network and SBS GS network to provide a more robust, economic, and better integrated navigation capability that can act as a backup to the existing GNSS-based aircraft navigation system.

According to a first embodiment of the present invention, there is provided a system and method for determining aircraft position by passively listening to DME transponder ground stations broadcasting periodic navigation heartbeat signals to enable aircraft to perform self-positioning and navigation by multilateration, independent of GPS capability. The periodic broadcast signal eliminates the need for aircraft to interrogate the DME ground stations, which greatly increases the system capacity (theoretical capacity approximates an infinite number of aircraft).

By broadcasting periodic navigation heartbeat signals from existing DME ground stations aircraft can multilaterate their own position, providing a viable backup navigation solution to GNSS-based systems. Aircraft receiving the navigation heartbeat signals may also perform deep integration with GPS navigation signals to achieve better accuracy and integrity. Deep integration refers to the combining of propagation times or time differences within the internal computations of different navigation systems, such as GPS and DME, as opposed to using complete solutions from each system separately. The improved vertical accuracy further increases the potential of conducting higher-category instrument landing systems (ILS) operations thus improves airport efficiency in adverse weather conditions.

In addition, the periodic heartbeat signals may include encoded data, such as signal integrity information, that can be reported to the aircraft. The following sections disclose systems and methods for implementing navigation heartbeat signals (i) using the DME transponder uplink or (ii) using the Mode-S uplink. The term "navigation heartbeat signal" in this document is used to describe periodic or semi-periodic (with staggered pseudo-random delays) broadcasting of the navigation signal from one or more of a DME transponder, a SBS GS transmitter, a multilateration interrogator, a timing reference transmitter or any other transmitter that transmits on the DME frequency range, which includes the SSR or ADS-B uplink and downlink frequency bands, for the purpose of assisting aircraft in performing self-positioning and navigation functions.

DME Navigation Heartbeat Signal

The DME heartbeat signals are transmitted by a group of DME transponders synchronously every predetermined time period on the DME uplink frequency. Since each DME transponder is assigned a different uplink channel, with each uplink channel defined by frequency and mode or pulse spacing code, there is no garbling of the DME heartbeat signals. However, to receive multiple signals from different DME transponders that are transmitted on different uplink channels in the DME frequency band, a multi-channel DME receiver is required.

Further, to distinguish the heartbeat signal from a DME reply signal or a DME transponder broadcasting its own ID, the DME heartbeat signal is a special signal having a higher priority than normal-operation DME transmissions, and is overlaid on top of normal DME operations. The special heartbeat signal is a sequence of DME pulse-pairs transmitted with a certain pulse position sequence. Upon receiving the DME heartbeat signals, the multi-channel DME receiver correlates each of the heartbeat signals with other heartbeat signals based on the known pulse position coded sequence.

The DME multi-channel receiver determines the time of arrival (TOA) of the heartbeat from each DME transponder by correlating the pulse peaks at the beginning of the heartbeat sequence. When the DME multi-channel receiver receives a second heartbeat signal from a different DME transponder, the DME multi-channel receiver determines the TOA of the second heartbeat signal and determines a TDOA measurement using the two determined TOAs. The position of the aircraft can be determined by determining TOAs for heartbeat signals from at least four DME transponders and combining the determined TOAs to determine three TDOAs. This allows a full three-dimensional solution. A minimum of three TOAs can be combined to determine two TDOAs which enable an approximate two-dimensional position of the aircraft to be estimated.

In addition, a TDOA determined from two DME heartbeat signals can also be combined with TDOAs determined from other signals, including Mode-S heartbeat signals and GPS signals, to determine the position of the aircraft. For aircraft that are actively interrogating DME transponders, the range measurements determined using the transmission of the interrogation signal and receipt of the reply signal can also be used with TDOAs calculated from DME heartbeat signals, Mode S heartbeat signals or GPS generated TDOAs for calculating the aircraft's own position.

Since the bandwidth of a DME heartbeat transmission is less than 1 MHz, the range accuracy obtained by a single DME pulse pair is not as accurate as that of Mode-S pulses. However this is overcome by introducing a long heartbeat sequence such that higher accuracy is obtained by integrating over the entire sequence during the correlation process.

In one embodiment, the pulse position coded heartbeat sequence is identical for all DME transponders to simplify the processing. This does not sacrifice the ability to distinguish one transponder heartbeat from another, since each DME transponder is assigned a different frequency channel.

The present invention assumes that the DME heartbeat signal has the highest transmitting priority over transmitting interrogation replies and ID broadcasts. Assuming a 30-pulse pair DME heartbeat signal, the impact of transmitting the DME heartbeat signal as the highest transmitting priority to the range interrogation-reply operation is equivalent to a reduction of capacity of 1 aircraft because the average interrogation rate per aircraft is assumed to be about 30 pulse pairs per second. The impact on the ID broadcasting is also minimal as the effect of overlaying such signal on top of the Morse-code periods will cause only negligible audio glitches.

If GPS timing signals are not available to the DME transponders, the time synchronization between DME heartbeat transmitters needs to be maintained. The time synchronization of the DME heartbeat transmitters can be maintained through internal means, such as a Rubidium oscillator, or external means, such as WAAS satellite time synchronization, for example.

In the present invention, the current standardized modulation techniques are assumed for navigation heartbeat signals on 1030 MHz UF, 1090 MHz DF, and DME uplink. The previous paragraphs describe the technique in terms of the DME uplink standard, but it is equally applicable to 1030 MHz UF and 1090 DF operating on the same band. The 1030 MHz UF uses BPSK modulation, 1090 DF uses PPM modulation, and the DME uplink signal is an amplitude modulated pulse pair. All of the above modulation forms are well-documented by international standard. The techniques above, however, can also be used with modified forms of modulation on these frequency bands.

For example, the 1090 DF and the DME uplink both use amplitude modulation with no reference to phase or frequency variations. In one embodiment, these waveforms are modified to carry additional information with one of a phase modulation or a frequency modulation in addition to the amplitude modulation. The encoding of the heartbeat messages described above can be carried out effectively using such a "new" or currently non-standardized modulation method.

In one embodiment, the new or currently non-standardized modulation method carries the time of transmission of a heartbeat signal. Current modulation techniques used on the DME uplink and message structure may not have any unused information payload in which to carry time of transmission information. Encoding the heartbeat signal with time of transmission information enables the asynchronous broadcasting of the heartbeat messages to avoid any synchronous garbling. With the transmission time encoded in the message, a staggered transmission time can be implemented without prior knowledge of the staggering sequence of transmission of the heartbeat signal at the receiver.

Mode-S Navigation Heartbeat Signal

The following section discloses the system and method for implementing navigation heartbeat signals using the Mode-S uplink.

In one embodiment of the present invention, the existing Mode-S Downlink Format (DF) or Uplink Format (UF) messages are used for broadcasting navigation heartbeat signals. The Mode-S UF signal is consisted of a pair of equal-power ATCRBS P1 P2 pulses followed by a sync phase reversal period and the DPSK payload containing either 56 or 112 bits (please refer to RTCA DO 181c for details) that is modulated on a 1030 MHZ carrier with a 3 dB bandwidth of approximately 6 MHz. The Mode-S DF signal consists of a four-pulse preamble followed by PPM data block payload containing either 56 or 112 bits (please refer to RTCA DO 181c for details) that is modulated on a 1090 MHZ carrier with a 3 dB bandwidth of approximately 6 MHz. Using either the UF or DF messages, a ground transmitter may broadcast a special type of the DF/UF message that conveys the heartbeat signal.

Assuming that the heartbeat signal is modulated onto the Mode-S 1090 MHz DF link, a special DF Type value can be designated to the data block header bits to indicate the heartbeat message and the rest of the payload can be used to carry transmitter-specific information such as identity and integrity information, for example. It is expected that synchronous broadcasting from multiple ground transmitters will most likely result in synchronous garbling because the length of the DF message often exceeds the propagation time difference between adjacent transmitters such that the overlapping (or garbling) of the heartbeat signal may prevent the reception of the correct heartbeat signal.

To overcome the garbling issue, in one embodiment of the present invention the transmission time of the heartbeat signals is simply staggered between adjacent DME transmitters by introducing pseudo-random delays to the transmission time. Such delays are transmitter-specific and are made known to the aircraft so that upon receiving heartbeat signal the aircraft can determine the synchronous transmission time of the heartbeat signals. While this approach mitigates garbling of the heartbeat signal, the non-synchronous nature introduces additional errors due to the distance traveled by the aircraft during the small amount of transmission time difference. Estimating this error includes estimating aircraft kinematics, which results in a more complicated estimation.

In another embodiment, the transmission time of the heartbeat signals uses Code Division Multiple Access principles. In this embodiment, each transmitter is assigned a specific bit sequence that is transmitted on the data payload and the receiver is able to determine the correct receiving time of the heartbeat signal by correlating any overlapped signals with the known bit sequence of each transmitter. This however does not resolve the garbling at the preamble and data block header bits. To resolve overlap at the preamble and data block header bits, one embodiment uses the following two-step approach:

1. A group of navigation heartbeat signal transmitters are selected to serve a particular airspace;
2. On the ground, one of the transmitters is selected as the master transmitter and the remaining transmitters are slave transmitters. The master transmitter tends to be the one located at the center of the group coverage;
3. At each predetermined UTC tick (any time period, such as 1 second, 0.5 second, 0.25 second, etc. that is synchronized to UTC) the transmitters simultaneously broadcast the heartbeat signals;
4. Prior to transmitting the heartbeat signal, the master transmitter transmits a pre-heartbeat signal in a predetermined time window, while the slaves do not transmit. The DF or UF message type header shall indicate that it is a pre-heartbeat message and the payload shall contain the identity of the master transmitter allowing receivers to retrieve the information regarding the master transmitter and associated slave transmitters. Such information includes at least the locations of the master transmitter and slave transmitters and the orthogonal heartbeat bit sequences of each individual transmitter;
5. After a fixed duration (assuming all transmitters are synchronized in time) the master transmitter and slave transmitters transmit the heartbeat signal, using the DF/UF message type header with a value indicating it is a heartbeat message, which is individually coded by its own bit sequence;
6. Upon receiving and successfully decoding the pre-heartbeat signal the receiver is then expecting the arrival of the actual heartbeat signals based on the maximum master transmitter-slave transmitter baselines and the known delay between the pre-heartbeat signal and the actual heartbeat signal. The receiver performs a correlation of the received signal with known replicas of the heartbeat signals. This correlation is done during the listening window cued by the pre-heartbeat signal transmitted by the master transmitter. The correlation peals indicate the arrival time of the heartbeat signal from individual transmitters. Note that the receiving of the heartbeat signal does not require successful decoding of the data block headers of the heartbeat since the pre-heartbeat signal provides the necessary cue for the receiver to perform correlations on the heartbeat signals. In this embodiment, the DF/UF type indicated by the header bits of the heartbeat signal is for legacy transponders to discern the type of message such that they will not attempt to decode the heartbeat messages;

7. The differences of the heartbeat arrival times among pairs of transmitters enables the range-difference from pairs of the transmitters to be determined;

8. The receiver calculates self position based on (i) the estimated range-difference from Mode-S heartbeats alone, or (ii) performs a deep integration by combining the range-difference measurements with that of GPS's and DME heartbeats' to arrive to a highly accurate solution. Optionally, barometric altitude information can also be used in solving the aircraft position.

The two-step approach allows proper reception of the heartbeat signals even in synchronous garbling situations such that synchronous heartbeat broadcasting by the transmitters is acceptable. The use of a master transmitter reduces the processing burden on the receiver as it only has to lock on to one transmitter rather than the entire group of transmitters. Note that groups of transmitters may be overlapping such that a single transmitter may be part of multiple groups and in this case the group transmission time of adjacent groups will be separated in time. The transmission time (for example, offset from the last UTC second) of individual groups are established and either made known to the receiver or included in the data payload of the master's pre-heartbeat message.

In case of GPS failure, the synchronization between transmitters needs to be maintained through other means. Techniques utilizing Rubidium oscillators or other means (such as using WAAS satellites) may be used for maintaining the synchronization of the transmitters independent of GPS.

The heartbeat transmission on the Mode-S data link may be carried in the 1030 MHz UF as well as 1090 MHz DF. Using 1030 MHZ is advantageous because 1030 MHz is less congested than the 1090 MHZ band. As the deployment of the NextGen ADS-B system progresses, more aircraft will be equipped with 1090 MHZ ADS-B transponders and more SSR will be decommissioned, the congestion on the 1090 MHz will worsen while the traffic on the 1030 MHz may decrease such that implementing Mode-S heartbeat on the 1030 MHz may be more advantageous.

The interference caused by the Mode-S heartbeat transmissions should be minimal due to the extremely low transmission rate per transmitter. Assuming a 1 Hz heartbeat and a group overlapping factor of 3 (each transmitter belongs to 3 groups) the introduced FRUIT rate (e.g., a synchronous interference rate) is only 3 fruit per second (fps) per transmitter. For a receiver that has 12 transmitters in range, the resulting FRUIT interference due to heartbeat transmission is only 36 fps such that the interference is negligible.

The principle of synchronously broadcasting heartbeat messages to facilitate navigation can be applied to other types of ground transmissions to facilitate aircraft navigation and this disclosure is not limited to only the examples mentioned previously. Systems such as the Universal Access Transceiver (UAT) radio link, VHF Data Link (VDL) Mode 1,2,3,4, and any other radio links can be used to transmit the heartbeat signal to facilitate navigation using the same principle.

In one embodiment, the DME transponder ground stations are equipped with a Mode-S transmitter and the Mode-S heartbeat signal is only transmitted on either 1030 MHz UL or 1090 MHz DL. This embodiment simplifies the aircraft avionics requirement by eliminating the need for a multi-channel receiver on each of the DME interrogators and no heartbeat signal is broadcasted on DME uplinks or downlinks.

In another embodiment, a single DME frequency (half channel) is reserved to broadcast a DME heartbeat signal from all SBS-GS sites and SME transponder ground sites. On this single DME frequency no normal DME operation is carried out and no Mode-S heartbeat signals are broadcast. This embodiment simplifies the aircraft avionics by transmitting DME heartbeat signals on a single DME frequency.

In another embodiment, a Mode-S heartbeat signal is only transmitted on either 1030 MHz UL or 1090 MHz DL and aircraft position is determined by deep integration of Mode-S heartbeat TDOAs, one or more DME interrogation ranges, and barometric altitude. The integration of the DME interrogation-reply range measurement with Mode-S heartbeat TDOAs and other sources may be the most attractive because of the wider coverage of SBS-GS and the higher range resolution of Mode-S signals. This embodiment is also advantageous because using a Mode-S heartbeat enables this embodiment to use the higher processing capacity of a ADS-B/Mode-S transponder, potentially making the necessary correlation processing capability a software upgrade to the ADS-B/Mode-S transponder.

An even wider deep integration can be carried out by including GPS TDOA and/or WAAS TDOA. However, a deep integration that combines raw DME interrogation reply signals and GPS/WAAS signals will require hardware modification.

DME Aided Aircraft Navigation

The following section discloses another embodiment of the present invention for providing aircraft with ground obtained positional measurement data to allow an aircraft to perform more robust self positioning by leveraging the WAM-GS (Wide Area Multilateration Ground Station) network to allow aircraft to multilaterate their own position at lower altitudes and/or with better accuracy without adding more DME sites.

Figure 5A:
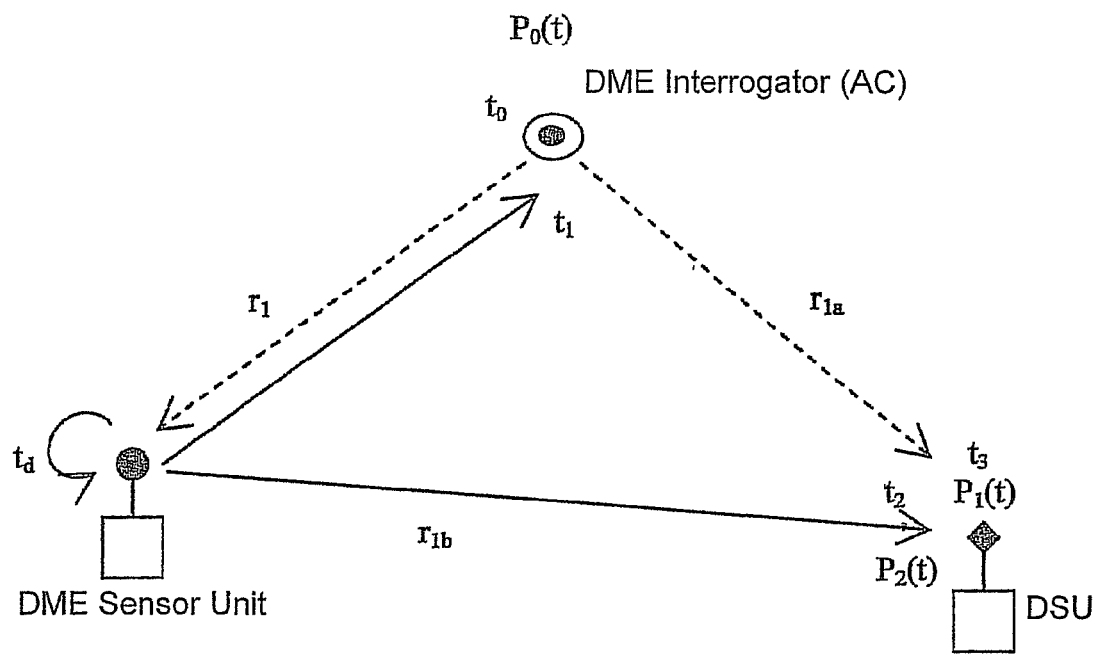
FIG. 5(a) illustrates a DME interrogator transmitting an interrogation signal and a DME transponder transmitting a reply signal that are received by the ground DME Sensor Unit (DSU) of one embodiment of DME aided navigation of the present invention.

This embodiment uses a ground DME Sensor Unit (DSU) that listens to both the DME interrogators and DME transponders. The principles of this embodiment of the present invention are illustrated in FIGS. 5(a)-(g). As shown in FIG. 5(a), the DME interrogator transmits an interrogation signal containing pulse pairs at $P_0(t)$, which is received at the DSU at $P_1(t)$. The DME transponder also receives the interrogation signal containing the pulse pairs from the DME interrogator and, after determining the interrogation pulse pairs are valid (that is, they have the proper spacing), transmits a reply signal containing the pulse pairs, which is received at the DSU at $P_2(t)$ as well as at the interrogating aircraft. An example of the interrogation signal containing the pulse pairs transmitted at $P_0(t)$, the received interrogation signal containing the pulse pairs received at the DSU at $P_1(t)$ and the reply signal containing the pulse pairs received at the DSU at $P_2(t)$ are shown in FIG. 5(b).

Figure 5C:
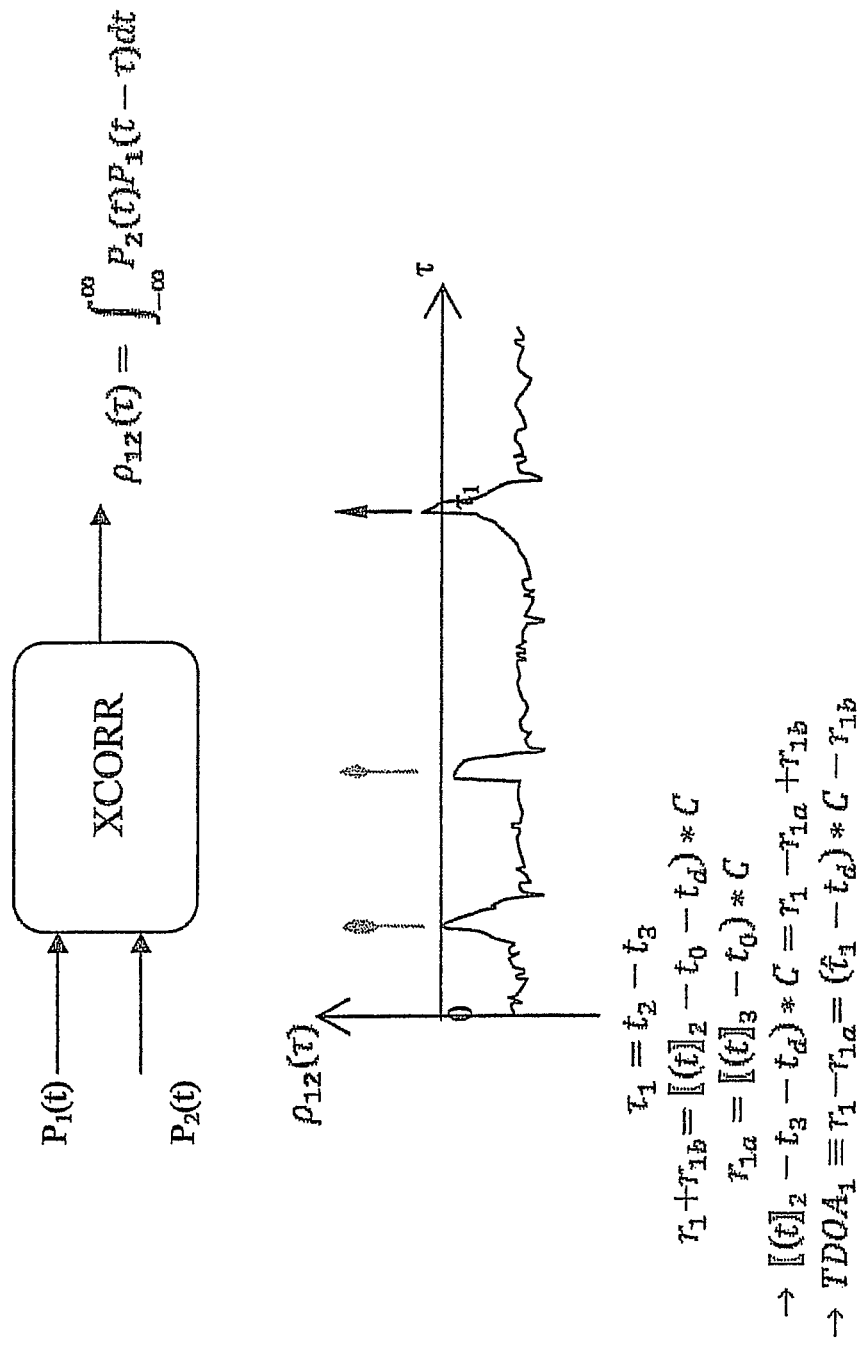
FIG. 5(c) illustrates an example of the cross correlation processing performed by the DSU of the present invention to identify an interrogation-reply event.

The DSU correlates received transponder reply signal containing the pulse pairs with received interrogation signal containing the pulse pairs to identify an interrogation-reply event. An example of the cross correlation processing performed by the DSU to identify an interrogation-reply event is shown in FIG. 5(c). The integral is taken over a time period which encompasses several interrogation and reply pulse pairs to allow the matching quasi-random pulse pair spacing to integrate above the non-matching pairs. Each interrogation-reply event is an attempt by an aircraft (e.g., DME transponder) to measure the range from the DME transponder to the DME transponder and is uniquely identifiable by the transmitted pulse pairs which are used by the DSU to correlate the interrogation signals and corresponding reply signals using peaks detection in the correlation process. An example of the transmitted pulse pairs transmitted in the interrogation signals and corresponding reply signals is shown in FIG. 5(d).

The correlation process measures the time delay between the transponder pulse and the interrogator pulse as they arrive at the DSU, and subtracts the known propagation delay of the transponder to the DSU ($r_{1b}$) and the transponder turnaround time ($t_d$) to determine a Time Difference of Arrival (TDOA) measurement ($r_{1a}-r_1$). The TDOA defines a hyperboloid in space on which the aircraft lies and with the DME transponder and the DSU at the foci.

Figure 5E:
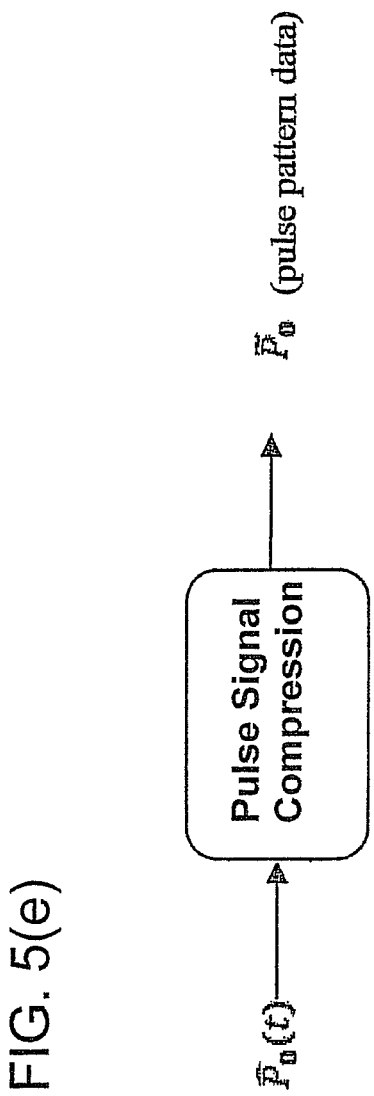
FIG. 5(e) illustrates an example of the compression of the transmitted pulse pairs pattern performed by the DSU in one embodiment of the present invention.
Figure 5F:
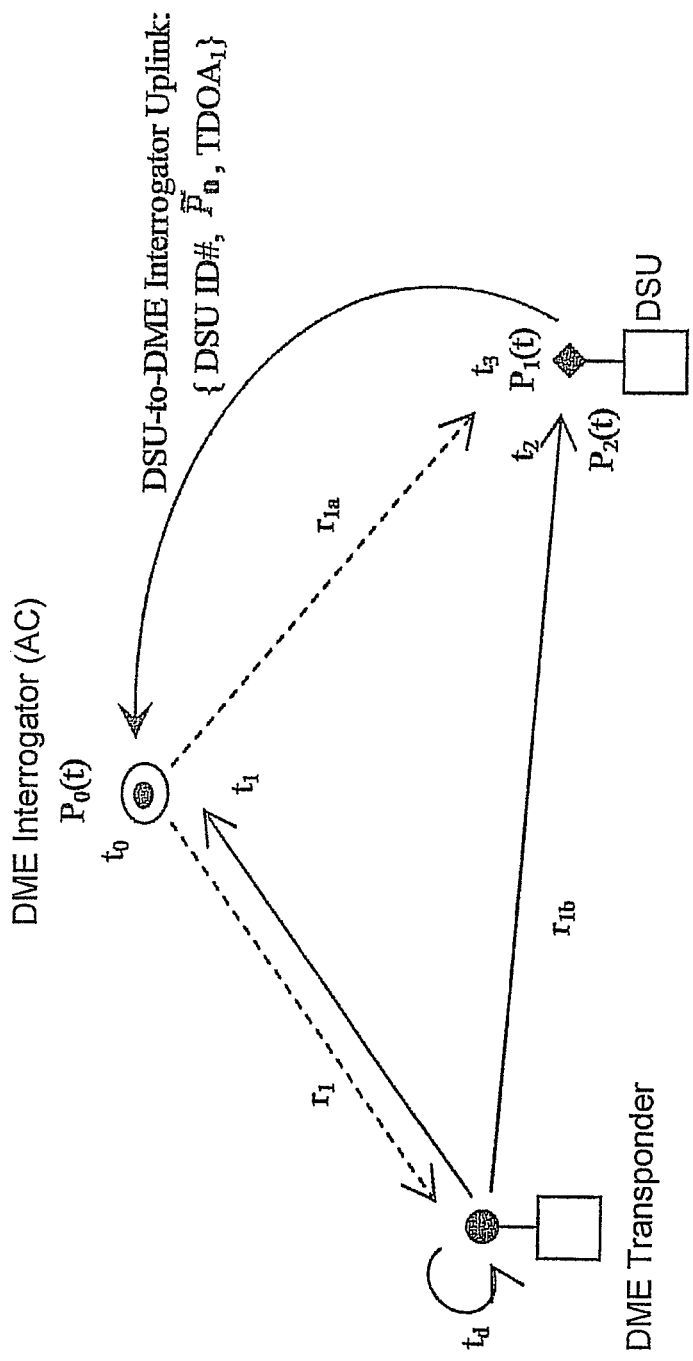
FIG. 5(f) illustrates the DSU transmitting TDOA for the interrogation-reply event and the DSU's identity (ID) to the aircraft in the present invention.
Figure 5G:
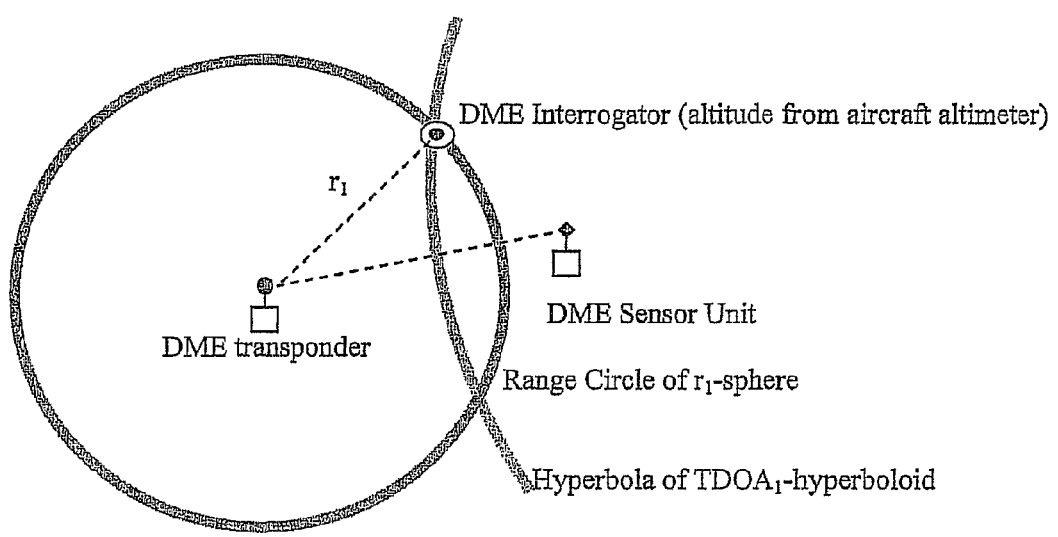
FIG. 5(g) illustrates the aircraft determining its position using DME range data, aircraft altitude data and TDOA from one embodiment of DME aided navigation of the present invention.

In one embodiment, after determining the transmitted pulse pairs pattern the DSU compresses the transmitted pulse pairs pattern, as shown in FIG. 5(e), and then transmits the compressed pulse pairs pattern and TDOA measurement for the interrogation-reply event, along with its own identity (ID) to the aircraft, as shown in FIG. 5(f). Upon receiving the transmitted information, the aircraft determines whether the received TDOA measurement can be associated with any prior interrogation event. When association is determined, the received TDOA measurement and the previously obtained range measurement for the interrogation-reply event are used for determining the aircraft position by intersecting the hyperbola of TDOA1-hyperboloid, the range D1 sphere and the aircraft altitude from the aircraft altimeter as shown in FIG. 5(g).

In situations where an aircraft cannot obtain a range to two or more DME transponder stations but is within the coverage area of a DSU, the DSU can determine a DTOA when the DSU receives the interrogation pulse pairs transmitted by the aircraft (DME interrogator) and the reply pulse pairs transmitted by the DME transponder interrogated by the aircraft, and the DSU transmits the determined DTOA to the aircraft and the aircraft can determine its own position.

In situations where DME-DME MLAT is available to the aircraft, any available DSU can still provide TDOA information to the aircraft such that a better position accuracy can be determined. This becomes useful when DME-DME MLAT does not provide sufficient accuracy to meet RNAV requirements.

If DSUs are integrated or co-located with conventional SSR MLAT/ADS-B ground receiving units, a TDOA measurement can be determined from SSR signals arriving at two or more DSU/SSR-MLAT units. If two or more DSU/SSR-MLAT units also receive DME interrogation pulse pairs from the aircraft and the reply pulse pairs from a common DME transponder, TDOA measurements can be determined from the DME interrogation-reply signals and the TDOA measurements obtained from the SSR signal can be associated such that information can be sent uniquely addressed to the aircraft via a Mode-S uplink.

In one embodiment, the present invention also includes avionics that solve aircraft position based on the DME interrogation-reply signal range measurements, the received TDOA measurements, altimeter data, and DME and DSU location data.

Slave DME—DME Navigation

The following section discloses another embodiment of the present invention for enabling an aircraft to position itself based on transmitted DME signals using a new "Slave DME" device. The Slave DME device is a repeater or "parrot" device that listens for reply signals transmitted by a DME transponder that retransmits the reply signals transmitted by a DME transponder on a different frequency after a known time delay. An aircraft that interrogates a DME transponder will receive more than one reply signal, the first reply signal being one from the DME transponder and the others from one or more Slave DME devices on different predetermined frequencies after known time delays. Using the present invention, aircraft correlate the received reply signals transmitted by the DME transponder and the received reply signals transmitted by one or more Slave DME devices, determine TDOA from the at least two received reply signals and determine aircraft position using one or more TDOAs and range determined from the DME interrogation-reply. As in discussions above, the known time delays between reception and reply from DME transponders and slave DME devices, and the known propagation times between DME transponder and slave DME devices are subtracted from total time delays to get TDOA.

Figure 6:
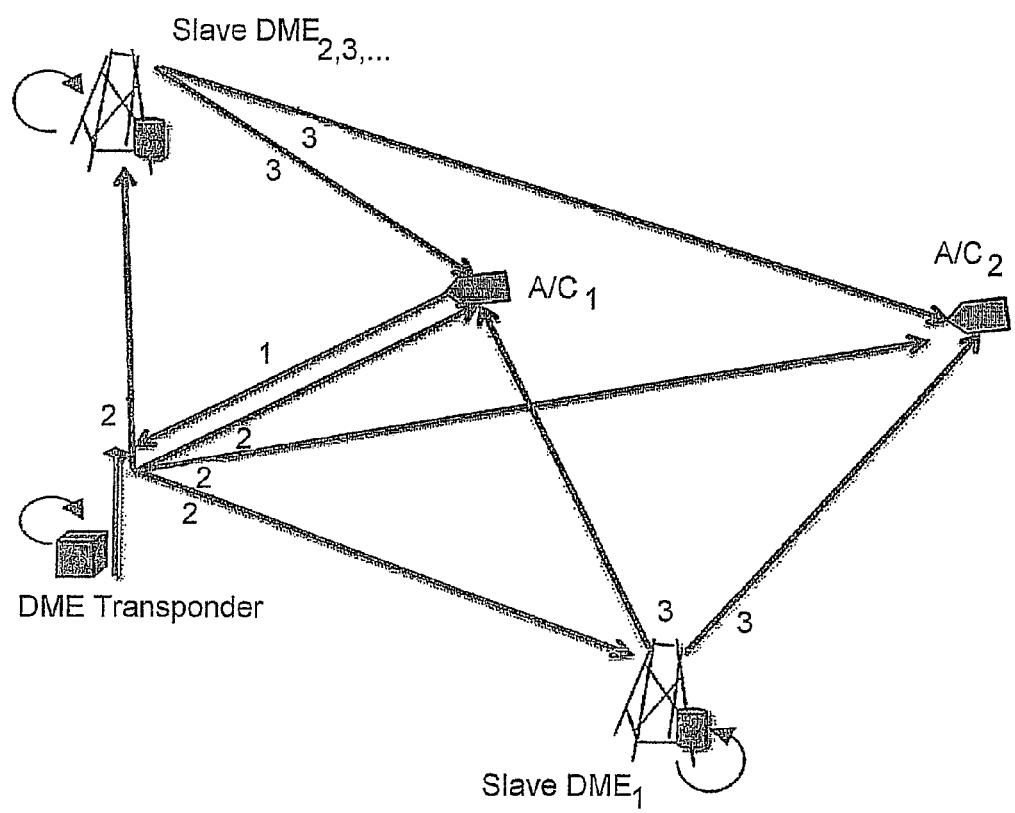
FIG. 6 illustrates one embodiment of the Slave DME-DME navigation system of the present invention.

For the following discussion, we will limit the received reply signals to a first reply signal transmitted by the DME transponder and second and third reply signals transmitted by two Slave DME devices, as shown in FIG. 6. The aircraft transmits an interrogation signal, which is shown as (1) in FIG. 6, and the DME transponder receives the interrogation signal, determines whether the received interrogation signal is valid and when the interrogation signal is determined to be valid, transmits a reply signal, which is received by the aircraft (A/C #1), both of the Slave DME devices and a second aircraft (AC #2), as shown as (2) in FIG. 6.

Figure 7:
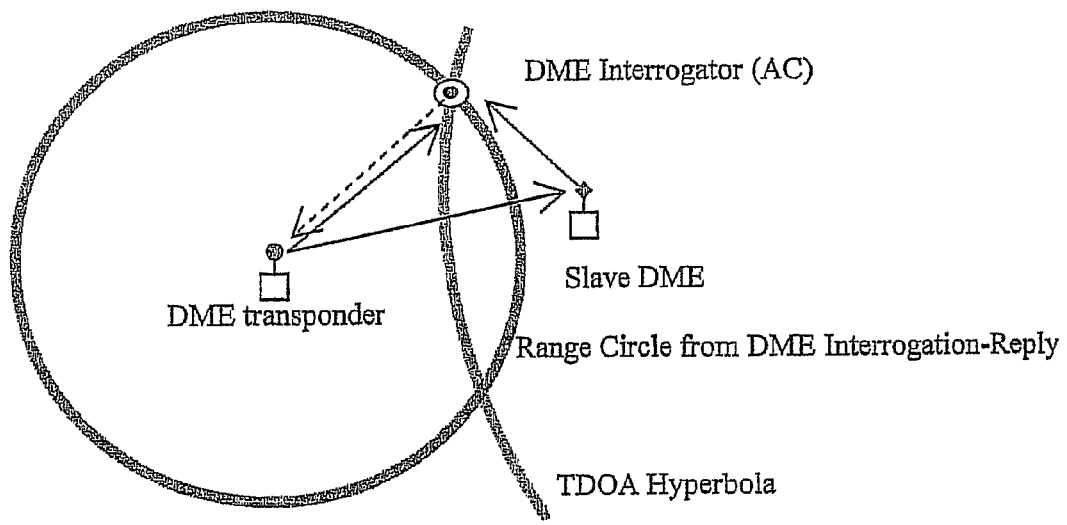
FIG. 7 illustrates an aircraft determining its own position using DME range data, aircraft altitude data and TDOA from the Slave DME-DME navigation system of the present invention.

In one embodiment, the Slave DME devices retransmit the reply signal after predetermined delays on different predetermined frequencies, which is received by the aircraft (A/C #1) and the second aircraft (AC #2), as shown as (3) in FIG. 6. For each period of observation time or epoch, a cross-correlation (XCORR) operation is then performed on the received reply signals and a time delta measurement is obtained from the peak position of the XCORR. This epoch encompasses several interrogation and reply pulse pairs to allow the matching quasi-random pulse pair spacing to integrate above the non-matching pairs. Since the time delay between the DME transponder transmitting the reply signal and the time a Slave DME retransmits at least the first pulses of the reply signal (e.g., parroting delay) is known, a TDOA is determined defining a hyperboloid with the DME transponder and the Slave DME device on the foci. The aircraft determines the range to the DME transponder from the DME interrogation-reply event. The position of the aircraft is determined using the determined range, TDOA, and the barometric altitude of the aircraft, as shown in FIG. 7.

In another embodiment, another aircraft, shown as A/C2 in FIG. 6, does not receive or use a range measurement from a direct reply from the DME transponder. Instead, AC2 uses two or more TDOAs from the DME transponder and two or more slave DMEs to determine its position. This position estimate can be improved with more TDOAs from more pairs of DME transponders and slave DMEs. This position estimate can also be improved by incorporating barometric altitude.

In other embodiments, additional hyperboloids can be defined with the DME transponder and additional slave DMEs at the foci. These additional hyperboloids can be used to augment the position estimate of the aircraft or replace the DME interrogation-reply range or replace the barometric altitude in the position computation.

Figure 8:
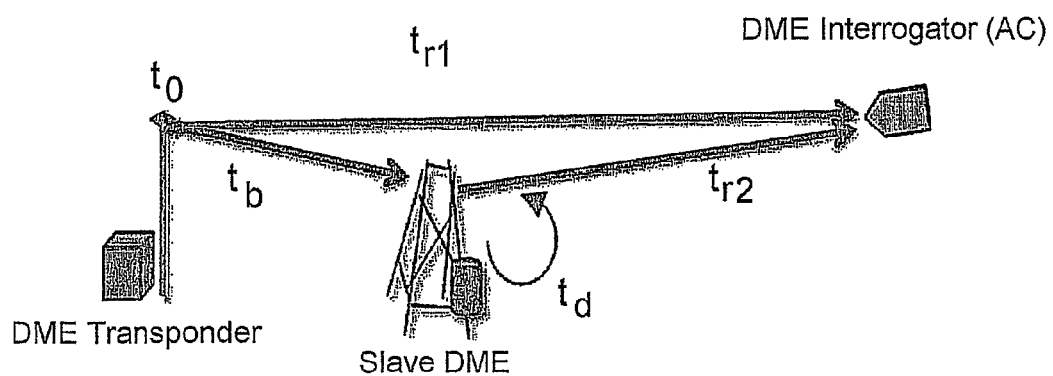
FIG. 8 illustrates a geometry in which the Slave DME device is located between the aircraft and the DME transponder in the Slave DME-DME navigation system of the present invention.
Figure 9:
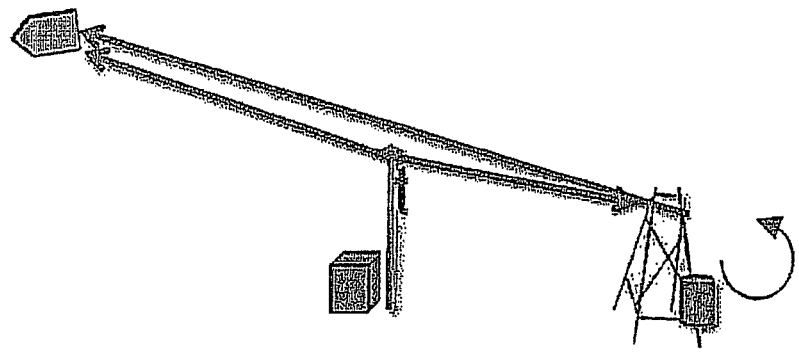
FIG. 9 illustrates a geometry in which the Slave DME device is located further from the aircraft than the DME transponder in the Slave DME-DME navigation system of the present invention.
Figure 10:
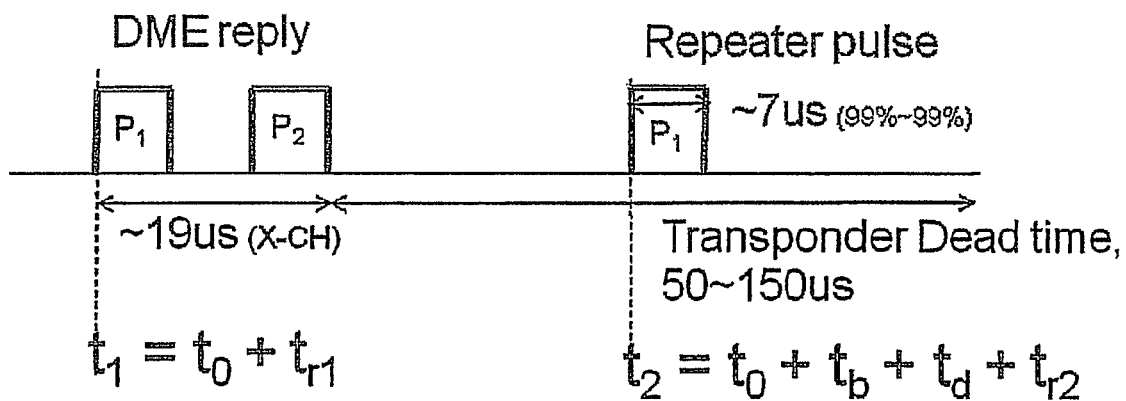
FIG. 10 illustrates the retransmitted signal of the Slave DME device in the dead-time window of the DME transponder.

In another embodiment, the Slave DME devices retransmit the first pulses of the received reply signal on the same frequency in the dead time window of the DME transponder, with a short ID of the Slave DME device modulated onto the transmitted pulses after a predetermined delay, which is received by the aircraft (A/C #1) and the second aircraft (AC #2), as shown as (3) in FIG. 6. As shown in FIG. 8, TDOA can be determined when the Slave DME device is located between the aircraft and the DME transponder for case 1. In this case the maximum TDOA is where $TDOA = t_{r1} - t_{r2} \sim +tb$. Similarly, TDOA can be determined when the Slave DME device is located further from the aircraft than the DME transponder for case 2, as shown in FIG. 9. In this case the minimum TDOA is where TDOA=$t_{r1}$-$t_{r2}$~-$t_b$. In the above cases, the Slave DME device's $P_1$ need to be within the dead-time window of the DME transponder, as shown in FIG. 10. Therefore, →($t_0$+$t_b$+$t_d$+$t_{r2}$)−($t_0$+$t_{r1}$)>19 us ($t_0$+$t_b$+$t_d$+$t_{r2}$)−($t_0$+$t_{r1}$)+7 us<19+(50~150) us →19 us<($t_b$+$t_d$+$t_{r2}$−$t_{r1}$)<62~162 us By case 1 ($t_{r1}$>~$t_b$+$t_{r2}$)→Slave DME device instrumental delay td>19⁻ us.

By case 2 ($t_{r2}$>~$t_b$+$t_{r1}$)→Slave DME device baseline delay tb<21.5⁻~71.5⁻ us or 3.5⁻~11.6⁻ NM.

With a Slave DME device instrumental delay of greater than 19 us, the received signal retransmitted by the Slave DME device will not overlap with received signal from the DME transmitter.

With DME-Slave DME device baseline of no more than 3.5 to 11.6 NM (dependent on the transponder dead time window) the received signal that is retransmitted by the Slave DME device will be contained in the dead time window and not overlap with subsequent legacy DME signals.

TDOA (from a DME and its Slave DME device) is $t_{r1}$−$t_{r2}$ and can be measured by:

TDOA=$t_1$−$t_2$−$t_b$−$t_d$

Where $t_b$, $t_d$ are published and available in the avionics' database. This TDOA defines a hyperboloid where target must lie upon and whose foci are the DME and the Slave DME device.

In embodiments in which the Slave DME devices transmit at least the first pulses of the received reply signal on the same frequency as the reply signal, different methods are used to distinguish the retransmitted signals of one Slave DME device from another Slave DME device and the reply signal transmitted by the DME transponder. In one embodiment, the dead time window of the DME transponder is divided into multiple time slots and each Slave DME device is assigned a time slot within the dead time window of the DME transponder. This TDMA method is the simplest and is advantageous when a longer DME transponder dead time is available.

In another embodiment, each Slave DME device has a different DME pulse width assigned that is within the specification requirement of a 50%~50% voltage pulse width anywhere from 3 us to 4 us. In yet another embodiment, each retransmitted pulse of each Slave DME device contains a non-linear smooth phase (or equivalently frequency) transition (e.g. 0°, 90°, ±180°, −90° phase shifts for identifying up to four Slave DME devices. Note that spec allows ±0.01% frequency deviation from the assigned channel carrier s.t. ~±100K Hz deviation is allowed.

The Slave DME-DME navigation of the present invention does not require the DME interrogator to actively interrogate the DME transponder to determine TDOA. Instead, TDOA can be determined by passively listening to transmitted DME signals. When multiple Slave DME devices are available more than one TDOA can be obtained by interrogating one DME transponder and passively listening to the reply signal transmitted by the DME transponder on the predetermined frequency and the reply signals transmitted by multiple Slave DME devices after known predetermined delays, as shown by the second aircraft (AC #2) in FIG. 6. The second aircraft (AC #2) determines its own position using two or more TDOAs and the barometric altitude of the second aircraft (AC #2).

One of the advantages of this embodiment of the present invention is the elimination of the need to simultaneously interrogate two or more DME transponders for an aircraft to determine its position. In this embodiment, the aircraft needs to be equipped with a DME transponder having a single transmit (Tx) channel and multiple receive (multi-Rx) channels. However, the reduction in DME transmissions required to determine own position not only reduces the cost of DME navigation avionics but also reduces the number of interrogation signals transmitted thereby reducing congestion on DME frequencies.

It will be understood that various modifications and changes may be made in the present invention by those of ordinary skill in the art who have the benefit of this disclosure. All such changes and modifications fall within the spirit of this invention, the scope of which is measured by the following appended claims.

The invention claimed is:

1. A DME aided multilateration method for a DME interrogator to determine its own position, the method comprising:
   transmitting interrogation pulses from a DME interrogator that are received by a DME transponder and at least one DME sensor unit (DSU);
   transmitting reply pulses from the DME transponder in response to the interrogation pulses that are received from the DME interrogator;
   providing at least one DSU for
      receiving and determining a TOA for the interrogation pulses transmitted by the DME interrogator and the reply pulses transmitted by the DME transponder,
      associating the received interrogation pulses and reply pulses,
      determining a time delay between associated interrogation pulses and reply pulses,
      determining a time difference of arrival (TDOA) from the determined time delay and the known distance between the DSU and the DME transponder, and
      transmitting at least the TDOA and the ID of the DSU to the DME interrogator;
   wherein the DME interrogator
      receives at least the TDOA and the DSU ID from the at least one DSU,
      associates the received TDOA from the at least one DSU to a specific transmission of interrogation pulses from the DME interrogator, and
      determines the DME interrogator position using the received TDOA and range data determined from the transmitted interrogation pulses and the received reply pulses in response to the transmitted interrogation pulses from the DME transponder.

2. The method of claim 1, further comprising
   receiving a Mode S signal from a Mode S transponder at two or more Mode S multilateration ground receiving units (RUs), wherein at least one RU is co-located with the DME transponder;
   determining at least one TDOA for the Mode S transponder signal;
   associating the at least one TDOA determined for the Mode S transponder signal with one or more received TDOAs clustered to a specific transmission of interrogation pulses from the at least one DME interrogator using time; and
   determining the position of the at least one DME interrogator using the one or more received TDOAs clustered to a specific transmission of interrogation pulses from the at least one DME interrogator, the at least one TDOA determined for the Mode S transponder signal and range data from the at least one DME transponder determined from the transmitted interrogation pulses and the received reply pulses in response to the transmitted interrogation pulses.

3. The method of claim 1, further comprising the DME interrogator using altitude data from an altimeter to determine the DME interrogator position.

4. The method of claim 1, wherein the received interrogation pulses are a DME DL transmission.

5. The method of claim 1, wherein the received reply pulses are a DME UL transmission.

6. A DME Aided Multilateration method for a DME interrogator to determine its own position, the method comprising:
transmitting interrogation pulses from at least one DME interrogator that are received by at least one DME transponder;
transmitting reply pulses from at least one DME transponder in response to the interrogation pulses that are received from the at least one DME interrogator;
providing at least one slave DME device for
  receiving the reply pulses transmitted by the at least one DME transponder, and
  retransmitting at least first pulses of the received reply pulses after a predetermined delay,
the at least one DME interrogator
  receiving the reply pulses transmitted by the at least one DME transponder;
  receiving the at least first pulses of the reply pulses transmitted by the at least one slave DME device,
  associating the received reply pulses transmitted by the at least one DME transponder and the at least first pulses of the reply pulses transmitted by the at least one slave DME device;
  determining a time delay between the received reply pulses transmitted by the at least one DME transponder and the at least first pulses of the reply pulses transmitted by the at least one slave DME device;
  determining a time difference of arrival (TDOA) from the determined time delay and the known transmission delay of the at least one slave DME device, and
  determining the position of the at least one DME interrogator using the determined TDOA and range data from the at least one DME transponder determined from the transmitted interrogation pulses and the received reply pulses in response to the transmitted interrogation pulses.

7. The method of claim 6, further comprising
receiving a Mode S signal from a Mode S transponder at two or more Mode S multilateration ground receiving units (RUs), wherein at least one RU is co-located with the DME transponder;
determining at least one TDOA for the Mode S transponder signal;
associating the at least one TDOA determined for the Mode S transponder signal with received TDOAs clustered to a specific transmission of interrogation pulses from the at least one DME interrogator using time; and
determining the position of the at least one DME interrogator using the received TDOAs clustered to a specific transmission of interrogation pulses from the at least one DME interrogator, the at least one TDOA determined for the Mode S transponder signal and range data from the at least one DME transponder determined from the transmitted interrogation pulses and the received reply pulses in response to the transmitted interrogation pulses.

8. The method of claim 6, further comprising the DME interrogator using altitude data from an altimeter to determine the DME interrogator position.

9. A slave DME-DME navigation system, comprising:
a DME interrogator;
a DME transponder; and
at least one slave DME device;
wherein the DME interrogator transmits interrogation pulses that are received by the DME transponder and the DME transponder transmits reply pulses in response to the received interrogation pulses;
the at least one slave DME device receives the reply pulses transmitted by the DME transponder and retransmits at least first pulses of the received reply pulses after a predetermined delay;
wherein the DME interrogator
  receives the reply pulses transmitted by the DME transponder and the at least first pulses of the received reply pulses retransmitted by the at least one slave DME device after the predetermined delay,
  associates the received reply pulses transmitted by the DME transponder and the at least first pulses of the received reply pulses retransmitted by the at least one slave DME device,
  determines at least one time difference between the received reply pulses transmitted by the DME transponders and the at least first pulses of the received reply pulses retransmitted by the at least one slave DME device,
  determines at least one TDOA from the determined at least one time difference and the predetermined delay of the at least one slave DME device, and
  determines a position of the DME interrogator using the at least one TDOA and range data from the DME transponder determined from the transmitted interrogation pulses and the received reply pulses in response to the transmitted interrogation pulses.

10. The system of claim 9, further comprising an altimeter providing altitude data, wherein the system uses the altitude data, the determined TDOA measurement and range data from the DME transponder to determine the position of the DME interrogator.

11. The system of claim 9, wherein the at least one slave DME device retransmits the at least first pulses of the received reply pulses on a different frequency after a predetermined delay.

12. The system of claim 9, wherein the at least one slave DME device retransmits the at least first pulses of the received reply pulses on the same frequency after a predetermined delay.

13. The system of claim 12, wherein the at least first pulses of the received reply pulses are retransmitted in a DME dead-time window of the DME transponder with a short ID of the at least one slave DME device modulated onto the reply pulses.

14. The system of claim 9, wherein the DME interrogator is an aircraft.

15. The system of claim 9, wherein the DME-DME navigation system comprises two or more slave DME devices and another DME interrogator receives the reply pulses transmitted by the DME transponder and the reply pulses retransmitted by the two or more slave DME device and determines a position for the another DME interrogator using at least two TDOAs determined from the received reply pulses transmitted by the DME transponder and the reply pulses retransmitted by the two or more slave DME devices.

16. The system of claim 13, wherein the DME dead-time window is divided into multiple slots and each slave DME device is assigned a time slot within the DME dead-time window.

17. The system of claim 9, wherein each slave DME device of the at least one slave DME device retransmits the at least first pulses of the received reply pulses using pulse width encoding.

18. The system of claim 9, wherein each slave DME device of the at least one slave DME device retransmits the at least first pulses of the received reply pulses using phase shift keying.

19. A DME aided multilateration system, the system comprising
a plurality of DME transponders;
at least one DME sensor unit (DSU); and
at least one DME interrogator;
the at least one DME interrogator transmitting interrogation pulses that are received by at least one DME transponder and at least one DME transponder transmitting reply pulses in response to the interrogation pulses that are received from the at least one DME interrogator;
wherein the at least one DSU receives the interrogation pulses transmitted by the at least one DME interrogator and the reply pulses transmitted by the at least one DME transponder, determines a time of arrival (TOA) for the interrogation pulses and the reply pulses, associates the received interrogation pulses and reply pulses, determines a time delay between associated interrogation pulses and reply pulses, determines a time difference of arrival (TDOA) from the determined time delay and the known distance between the DSU and the at least one DME transponder and transmits at least the TDOA and the DSU ID to the at least one DME interrogator;
wherein the DME interrogator receives at least the TDOA and the DSU ID from the at least one DSU, associates the received TDOA from the at least one DSU with one or more received TDOAs clustered to a specific transmission of interrogation pulses from the at least one DME interrogator using time, and determines the DME interrogator position using the received TDOA and range data determined from the transmitted interrogation pulses and the received reply pulses.

20. The system of claim 19, further comprising at least two Mode S multilateration ground receiving units (RUs) and at least one of the at least two Mode S RUs is co-located with the DME interrogator, wherein the at least two Mode S RUs receive a Mode S signal from a Mode S transponder and determine at least one TDOA from the Mode S signal; associate the at least one TDOA for the Mode S signal with the TDOA determined by the at least one DSU using time and determine the position of the at least one DME interrogator using the determined by the at least one DSU, the determined TDOA for the Mode S transponder signal and range data from the at least one DME transponder determined from the transmitted interrogation pulses and the received reply pulses in response to the transmitted interrogation pulses.

21. A method for a target to multilaterate own position, the method comprising:
receiving a heartbeat signal transmitted by a plurality of ground transmitters of known location;
time stamping a time of arrival (TOA) for the received heartbeat signals at the target;
pairing the received heartbeat signals and determining a time difference of arrival (TDOA) between the received heartbeat signals using the TOAs; and
determining the position of the target from the determined TDOAs.

22. The method of claim 21, wherein the heartbeat signal is transmitted by a plurality of DME transponders and the heartbeat signal comprises a sequence of pulse pairs with a predetermined pseudo-random pulse-pair-to-pulse-pair spacing pattern known to the DME interrogators and
the DME interrogators determines the time of arrival (TOA) of DME heartbeat signals by correlating the received DME transponder signals with the known heart beat pulse-pair-to-pulse-pair spacing patterns.

23. The method of claim 22, wherein the heartbeat signals are transmitted simultaneously by at least some DME transponders of the plurality of DME transponders on DME transponder reply transmission frequency bands.

24. The method of claim 23, wherein the target determines TDOAs from the TOAs for each pair of DME transponder of the plurality of DME transponders and determines own position from the TDOAs determined for each pair of DME transponders of the plurality of DME transponders.

25. The method of claim 22, wherein at least some of the heartbeat signals are transmitted non-simultaneously with known time offsets for each DME transponder on DME transponder reply transmission frequency bands.

26. The method of claim 25, wherein the time offsets are encoded in the heartbeat signals.

27. The method of claim 25, wherein the target determines TDOAs by subtracting the known time offsets from the TOAs for each pair of DME transponders of the plurality of DME transponders and determines own position using the TDOAs determined for each pair of DME transponder of the plurality of DME transponders.

28. The method of claim 21, wherein the heartbeat signal is transmitted by a plurality of Mode S ground receiver units (RUs).

29. The method of claim 28, wherein the heartbeat signals are transmitted simultaneously by at least some of the RUs of the plurality of RUs.

30. The method of claim 29, the heartbeat signals that are transmitted simultaneously further comprising:
selecting a group of ground transmitters of known location of the plurality of ground transmitters of known location to cover a particular area;
selecting one of the group of ground transmitters of known location as a master transmitter and the remaining ground transmitters of the group of ground transmitters as slave transmitters;
transmitting a pre-heartbeat signal from the master transmitter in a predetermined time window prior to transmission of the heartbeat signal; and
transmitting the heartbeat signal from at least the group of ground transmitters of known location a predetermined time period after the pre-heartbeat signal.

31. The method of claim 30, wherein the heartbeat signals transmitted by each RU further comprises a data payload comprising a known direct-sequence spread spectrum (DSSS) coding that is unique to each RU and is orthogonal to DSSS coding in heartbeat signals of other RUs;
correlating each received heartbeat signal with the known DSSS coding of each RU to determine TOA for each received heartbeat signal at the target;
determining TDOAs from the TOAs for each pair of RUs of the plurality of RUs at the target; and
determining own position from the TDOAs from the plurality of RUs at the target.

32. The method of claim 28, wherein the heartbeat signals are transmitted non-simultaneously by at least some RUs of the plurality of RUs with known time offsets for each RU.

33. The method of claim 32, wherein the time offsets are encoded in the heartbeat signals.

34. The method of claim 32, wherein the target determines TDOAs by subtracting the known time offsets from the TOAs for each pair of RUs of the plurality of RUs and determines own position using the TDOAs determined for each pair of RUs of the plurality of RUs.

35. The method of claim 21, wherein the target determines own position by a combination of TDOAs from a plurality of DME transponders and TDOAs from a plurality of RUs.

36. The method of claim 28, wherein the Mode-S RU heartbeat signals are transmitted by a plurality of DIME transponders.

37. The method of claim 28, wherein the Mode-S RU heartbeat signals are transmitted by RUs co-located with DME transponders.

38. A system for a target to determine its own position, the system comprising
a plurality of ground transmitters of known location; and
at least one target;
the plurality of ground transmitters of known location transmitting a heartbeat signal;
the at least one target receives the heartbeat signal from at least three ground transmitters of the plurality of ground transmitters, determines a time of arrival (TOA) for the received heartbeat signals, determines a time difference of arrival (TDOA) between the received heartbeat signals using the determined TOAs, and determines the position of the target from the determined TDOAs.

39. The system of claim 38, wherein the heartbeat signal is transmitted by a plurality of DME transponders;
the heartbeat signal comprises a sequence of pulse pairs with a predetermined pseudo-random pulse-pair-to-pulse-pair spacing pattern known to DME interrogators; and
the DME interrogators determine the time of arrival (TOA) of DME heartbeat signals by correlating the received DME transponder signals with the known heartbeat pulse-pair-to-pulse-pair spacing patterns.

40. The system of claim 39, wherein the plurality of ground transmitters are DME transponders and at least some of the DME transponders transmit the heartbeat signal simultaneously on DME transponder reply transmission frequency bands.

41. The system of claim 40, wherein the target determines TDOAs from the TOAs for each pair of DME transponder of the plurality of DME transponders and determines own position from the TDOAs determined for each pair of DME transponders of the plurality of DME transponders.

42. The system of claim 39, wherein at least some of the plurality of DME transponders transmit the heartbeat signal non-simultaneously with known time offsets for each DME transponder on DME transponder reply transmission frequency bands.

43. The system of claim 42, wherein the time offsets are encoded in the heartbeat signals.

44. The system of claim 42, wherein the target determines TDOAs by subtracting the known time offsets from the TOAs for each pair of DME transponder of the plurality of DME transponders and determines own position using the TDOAs determined for each pair of DME transponders of the plurality of DME transponders.

45. The system of claim 39, wherein the plurality of ground transmitters are a plurality of Mode S ground receiver units (RUs).

46. The method of claim 45, wherein at least some of the plurality of RUs transmit the heartbeat signal simultaneously.

47. The system of claim 46, further comprising:
a group of ground transmitters of known location of the plurality of ground transmitters of known location are selected to cover a particular area;
one of the group of ground transmitters of know location is designated as a master transmitter and the remaining ground transmitters of the group of ground transmitters are designated as slave transmitters;
the master transmitter transmits a pre-heartbeat signal in a predetermined time window prior to transmission of the heartbeat signal; and
at least the group of ground transmitters of known location transmit the heartbeat signal at a predetermined time period after the pre-heartbeat signal.

48. The system of claim 47, wherein the heartbeat signals transmitted by each RU further comprises a data payload comprising a known direct-sequence spread spectrum (DSSS) coding that is unique to each RU and is orthogonal to DSSS coding in heartbeat signals of other RUs,
wherein a target correlates each received heartbeat signal with the known DSSS coding of each RU to determine TOA for each received heartbeat signal at the target,
the target determines TDOAs from the TOAs for each pair of RUs of the plurality of RUs at the target, and
the target determines own position from the TDOAs from the plurality of RUs at the target.

49. The method of claim 45, wherein at least some of the plurality of RUs transmit the heartbeat signal non-simultaneously with known time offsets for each RU of the plurality of RUs.

50. The system of claim 49, wherein the time offsets are encoded in the heartbeat signals.

51. The system of claim 49, wherein the target determines TDOAs by subtracting the known time offsets from the TOAs for each pair of RUs of the plurality of RUs and determines own position from the TDOAs from the plurality of RUs.

52. The system of claim 39, wherein the target determines own position by a combination of TDOAs from a plurality of DME transponders and TDOAs from a plurality of RUs.

53. A system for a target to determine its own position, the system comprising a plurality of ground transmitters of known location; and at least one target; wherein the plurality of ground transmitters of known location transmitting a heartbeat signal, and the at least one target receiving the heartbeat signal from at least three ground transmitters of the plurality of ground transmitters, determines a time of arrival (TOA) for the received heartbeat signals, determines a time difference of arrival (TDOA) between the received heartbeat signals using the determined TOAs, determines an altitude of the target from an altimeter, and determines the position of the target from the determined TDOAs and determined altitude.

* * * * *